US006832139B2

(12) United States Patent
Johnson et al.

(10) Patent No.: US 6,832,139 B2
(45) Date of Patent: Dec. 14, 2004

(54) GRAPHICAL SYSTEM CONFIGURATION PROGRAM FOR MATERIAL HANDLING

(75) Inventors: James Johnson, Whitehall, MI (US); Garry Koff, Grand Rapids, MI (US); Matt Werner, Ada, MI (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 0 days.

(21) Appl. No.: 10/394,546

(22) Filed: Mar. 21, 2003

(65) Prior Publication Data

US 2003/0233177 A1 Dec. 18, 2003

Related U.S. Application Data

(60) Provisional application No. 60/366,385, filed on Mar. 21, 2002.

(51) Int. Cl.[7] .............................................. G01C 22/00
(52) U.S. Cl. ......................... 701/23; 701/201; 701/206; 701/211; 701/212; 340/988; 340/990; 703/6
(58) Field of Search ...................... 701/23–25, 200–201, 701/206, 211–212, 207, 300; 340/988, 990; 700/96; 703/6

(56) References Cited

U.S. PATENT DOCUMENTS

| 4,604,718 A | | 8/1986 | Norman et al. ................. 703/6 |
| 4,827,423 A | * | 5/1989 | Beasley et al. ................ 700/96 |
| 5,088,045 A | * | 2/1992 | Shimanaka et al. ......... 700/110 |
| 5,191,528 A | | 3/1993 | Yardley et al. ................ 701/23 |
| 5,283,739 A | | 2/1994 | Summerville et al. ......... 701/23 |
| 5,835,684 A | | 11/1998 | Bourne et al. .............. 700/255 |
| 5,889,926 A | | 3/1999 | Bourne et al. .............. 700/255 |
| 6,041,171 A | * | 3/2000 | Blaisdell et al. ................ 703/6 |
| 6,049,745 A | | 4/2000 | Douglas et al. ............... 701/23 |
| 6,092,010 A | | 7/2000 | Alofs et al. ................... 701/23 |
| 6,240,335 B1 | * | 5/2001 | Wehrung et al. ............ 700/230 |
| 6,493,607 B1 | | 12/2002 | Bourne et al. .............. 700/255 |
| 2002/0138172 A1 | | 9/2002 | Bahri et al. ................. 700/217 |

* cited by examiner

Primary Examiner—Gertrude A. Jeanglaude
(74) Attorney, Agent, or Firm—Van Dyke, Gardner, Linn & Burkhart, LLP

(57) ABSTRACT

A graphical system configuration program allows material handling systems to easily be defined, configured, and implemented. The system may utilize a computer for configuring an automatic guided vehicle system. Information defining the path layouts for the AGVs, traffic control information, decisional logic for path branches, update marker information, and other information useful for controlling the operation of the automatic guided vehicles may be entered into the computer and displayed graphically. The computer is programmed to automatically verify the validity of the entered information, and to optionally simulate the movement of the automatic guided vehicles. After the information has been validated, it can be converted to a file format that is used by an automatic guided vehicle controller to control the vehicle's movement. Virtually the entire design process for the AGV system can therefore be carried out using a single computer program specifically adapted for that purpose.

48 Claims, 12 Drawing Sheets

| ENTITY | STORED DATA |
|---|---|
| Straight Path Segment | Segment ID; Path ID's; Number of Links to Start Point; Number of Links to Endpoint; Number of Associated Action Locations; Start Point Coordinates; End Point Coordinates; Linked Segment ID's; Action Location ID's. |
| Arc Path Segment | Segment ID; Path ID's; Number of Links to Start Point; Number of Links to End point; Number of Action Locations; Start Point Coordinates; End Point Coordinates; Center Point Coordinates; Start Angle; End Angle; Linked Segment ID's; Action Location ID's. |
| Update Markers | Marker ID; Coordinates of Marker. |
| Decision Points | Decision Point ID; Coordinates; Numeric Code Specification; Decision Logic. |
| Traffic Control Points | Traffic Control 10; Coordinates; Numeric Code Specifying Type of Traffic Control. |
| Initialization Points | Initialization Point ID; Coordinates; Path ID. |
| Command Points | Command Point ID; Coordinates; Numeric Code Specifying Type of Command. |

FIG. 11

GRAPHICAL SYSTEM CONFIGURATION PROGRAM FOR MATERIAL HANDLING

This application claims priority to commonly-titled U.S. provisional application Ser. No. 60/366,385, filed Mar. 21, 2002, the disclosure of which is incorporated herein by reference.

BACKGROUND OF THE INVENTION

The present invention relates to material handling systems, and more particularly to a program and method for designing and configuring a material handling system.

One type of material handling system that is found in a variety of factories, plants, and other environments is the automatic guided vehicle system. Automatic guided vehicles, or AGVs, are driverless vehicles that automatically carry or pull various loads of materials from one point to another point within an environment. These vehicles generally come in two different types: wire-guided and wireless AGVs. The wire-guided AGVs include sensors that allow the vehicles to follow energized wires buried in the floor of a facility. The wireless AGVs guide themselves without the use of wires. Some wireless AGVs occasionally detect update markers, which may be laser targets, magnets embedded in the floor, transponders, optical landmarks, or other devices which allow the vehicles to occasionally update their position within the facility.

AGV systems can also be broadly divided into another two categories: centrally controlled systems and distributed control systems. In a centrally-controlled AGV system, the movement of each AGV is controlled by a central controller. The central controller issues commands to the vehicles, such as telling them where to turn, what paths to follow, and what actions to take to avoid colliding with other vehicles. Distributed control AGV systems, in contrast, utilize AGVs that are capable of making many of their own decisions, such as where to turn, what paths to follow, and what actions are necessary to avoid colliding with other vehicles. These decisions are carried out by each individual vehicle, rather than a central controller that dictates their actions. Of course, some AGV systems can also be classified as hybrids of centralized and distributed control systems. Such systems include centralization of certain aspects and de-centralization of other aspects.

The installation and set-up of AGV systems in the past—whether they have been centralized, de-centralized, wire, or wireless systems—has often been a time-consuming and labor-intensive task. Virtually all AGV systems require a path to be laid out; traffic control logic or instructions to be determined; navigational information, such as the location of update markers, to be gathered and stored; and integration of the results of all of these tasks to be performed such that the system will function properly. In the past, these separate tasks have often been carried out manually, sometimes with different people working on different tasks or even different people working on the same task. This can lead to coordination problems where one person's work may not be properly communicated to another person whose work is affected by the first person's work. In such situations, design work may have to be re-done.

Besides these coordination difficulties, there is also a great deal of information that each person must know in order to accomplish the various design and installation tasks. For example, the people carrying out the system design tasks must know many details about the particular vehicles that are going to be installed. These details include the length and width of the vehicles, their turning radius, the length of any carts that will be towed behind the vehicles, the location of the vehicle's guidepoint, the minimum stopping distance of a fully loaded vehicle, and other information. If someone does not know these details, they may design a system that causes the vehicle to bump into obstacles, that has too sharp of turns for the vehicles to follow, that requires the vehicles to stop faster than they are able, that does not cause the vehicles to precisely travel to the desired locations, or that otherwise causes the system to improperly function. Installing new AGV systems, or modifying existing systems, has therefore required extensive training of the personnel assigned to carry out such tasks. This results in increased costs to both the AGV system designer, who must spend money training these people, and the AGV system customers, who rarely have such trained personnel on staff and therefore must contract with the system designer whenever they desire to modify their AGV system.

The prior methods of AGV installation have also complicated the marketing aspects of selling AGV systems. When selling and installing AGV systems, the AGV installer often has a number of different people in contact with the customer at various levels. These may include one or more sales people, project engineers, design engineers, and/or technicians. If all these people do not sufficiently know all of the details about the intended system design, it is possible for a number of miscommunications to occur. Such miscommunications may involve misunderstanding the customer's material handling requirements, making promises to the customer about the characteristics of the system that may not be possible to implement, or other miscommunications. The result of such miscommunications is often an increase in the costs of the design and installation process.

Another disadvantage of prior AGV system installation methods has been the uncertainty, until actual installation and testing, that the proposed system will actually meet the specified requirements. Customers of AGV systems often have timing requirements in which specified amounts material must be moved to different locations within a given amount of time. In complex AGV systems with large numbers of paths and large numbers of vehicles, it is often difficult to accurately predict how quickly material will get moved. If the initially installed system does not meet all of the specified requirements, changes may have to be made whose costs could have been otherwise mitigated if they had been part of the original system design. The advantages of a system designing process that mitigates these and other disadvantages can therefore be seen.

SUMMARY OF THE INVENTION

Accordingly, the present invention provides a method for installing AGV systems that simplifies the design and installation process. According to one of its various aspects, the present invention provides a central database of AGV and system information that minimizes the amount of training required for the system designers and installers. Pathways, traffic control, navigational information, and other system information are input into a computer in a simple, user-friendly manner, such as by way of a graphical interface. The computer is programmed to automatically perform certain design tasks, as well as to validate that the system design will function properly. The computer may be further programmed to simulate the movement of AGVs and material in a given environment to determine whether system requirements will be met or not.

According to a first embodiment of the present invention, a method for configuring a material handling system is provided. The method includes providing a computer having a visual display and inputting information into the computer that causes the computer to visually display at least a first path for a material handling vehicle. The method further includes inputting information into the computer to cause it to visually display at least one symbol representing at least one action location located at a position specified by the user. Further information is input into the computer that at least partially specifies what action will take place when the material handling vehicle reaches the action location. The computer is then used to create a computer file that contains the location of the path, the location of the action location, and the information that specifies what action will take place when the material handling vehicle reaches the action location. The computer file is transferred to a vehicle controller that is adapted to read the file and utilize the information contained therein to control the movement of the vehicle along the path and to control the action undertaken when the vehicle reaches the action location.

According to another aspect of the present invention, a method for configuring a material handling system is provided. The method includes providing a computer having a visual display and inputting into the computer path information that defines at least one path for a material handling vehicle. Information is also input into the computer that defines an action location and an action associated with that action location. The action associated with the action location is selected from the group consisting of: (a) determining whether a particular zone of the path is being occupied, and (b) determining which branch of the path a vehicle should follow at a path divergence. A computer file is created that contains the location of the path, the location of the action location, and the information that specifies what action will take place when the vehicle reaches the action location. The computer file is transferred to a vehicle controller adapted to read the file and utilize the information contained within the file to control the movement of the vehicle along the path and to control the action undertaken when the vehicle reaches the action location.

According to still another embodiment of the present invention, an apparatus is provided for graphically configuring a material handling system. The apparatus includes a computer, a visual display, a user interface device, and a vehicle controller. The visual display is in communication with the computer and is adapted to visually display information transmitted from the computer to the display. The user interface device is adapted to allow a user of the computer to input information that is displayed on the visual display. The computer is adapted to receive and display information from the user through the user interface that defines at least one path and at least one action location along the path. The computer is further adapted to receive and store information that at least partially specifies what action a material handling vehicle will take at the action location and to create a file containing the location of the path, the location of the action location, and the information that at least partially specifies what action will take place when the vehicle reaches the at least one action location. The vehicle controller is adapted to read the file and utilize the information contained within the file to control the movement of the vehicle along the path and to control the action undertaken when the vehicle reaches the action location.

According to yet another embodiment of the present invention, a method of configuring an automatic guided vehicle system is provided. The method includes providing a computer having a visual display and inputting information into the computer to cause the computer to visually display at least a first path for automatic guided vehicles. Information is also input into the computer that causes the computer to visually display a symbol representing a first action location and a symbol representing a second action location. The second action location is spaced from a first action location and defines a zone therebetween. Information is also input into the computer that causes a vehicle controller to check to see if the zone is occupied when a vehicle reaches either the first or second action location. A computer file is created that contains the location of the path, the location of the first and second action locations, and the information that causes the vehicle controller to check to see if the zone is occupied when a vehicle reaches either the first or second action locations. The computer file is transferred to the vehicle controller.

According to other aspects of the present invention, the information that is input into the computer may be input using a computer mouse, a track ball, a touch screen, a graphics tablet, or another type of device. The information may also be input into the computer such that it is graphically displayed over a floor plan of the environment in which the material handling system will operate. The computer may be programmed to allow the path which a vehicle will take from one destination to another destination to be highlighted when a user selects an arbitrary starting point and a destination. The computer may further be programmed to carry out a simulation of the movement of the automatic guided vehicles throughout a facility after the system has been sufficiently defined. The various aspects of the present invention simplify the overall design and implementation process of a material handling system. These and other benefits of the present invention will be apparent to one skilled in the art upon review of the following written description and the accompanying drawings.

BRIEF DESCRIPTION OF THE DRAWINGS

FIG. 11 is a chart of the data that may be stored in a computer file after a material handling system has been designed;

DETAILED DESCRIPTION OF THE INVENTION

Figure 1:
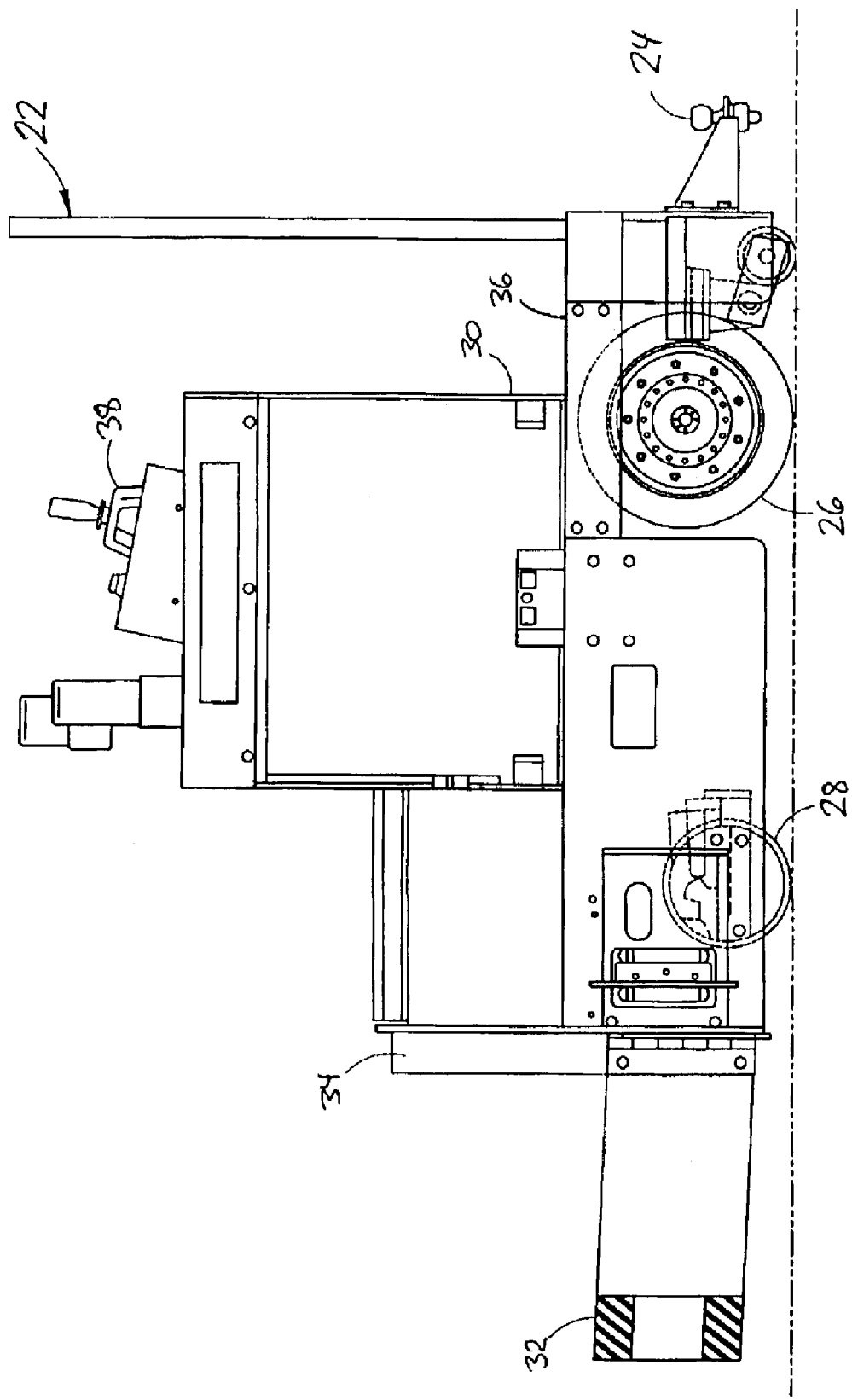
FIG. 1 is an illustrative side view of an AGV whose operation may be configured according to the various embodiments of the present invention.

The present invention will now be described with reference to the accompanying drawings wherein the reference numerals in the following written description correspond to like numbered elements in the several drawings. A method 20 according to one embodiment of the present invention is depicted schematically in FIG. 1. In general, method 20 is directed to an improved method for configuring a material handling system. While it may be used to configure other types of material handling systems, method 20 will be described in detail herein with respect to an automatic guided vehicle system. Method 20 allows the pathways that automatic guided vehicles will follow to be easily designed and implemented into the AGV system. It further allows a variety of other control logic to be easily designed and implemented, such as the logic used to guide vehicles through path branches, that used to avoid vehicle-to-vehicle or vehicle-to-object collisions, and a variety of other types of control logic. Method 20 thus facilitates the design and construction of an AGV material handling system. Method 20 is preferably carried out using a computer program and the terms "method 20" and "program 20" will be used herein interchangeably.

An example of an AGV 22 that may be configurable according to the present invention is depicted in FIG. 1. AGV 22 includes a hitch 24 to which may be attached a number of carts or trailers that carry material. AGV 22 thus tows its material handling loads behind it. This type of AGV is commonly referred to as a "tugger." It will be understood that the present invention finds equal application to all other types of AGVs, such as those that carry their loads on top of the vehicle, and any other type of automatic guided vehicle. AGV 22 depicted in FIG. 1 is generally a tricycle type of vehicle. It includes two rear wheels 26 that are aligned with each other and a front wheel 28. Front wheel 28 is steerable while rear wheels 26 are not. Rear wheels 26 are each powered by a motor or other automotive means. Typically, rear wheels 26 would be powered by an electric motor that receives power from a number of batteries positioned on the AGV. Such batteries may be contained in a battery storage compartment 30. In order to avoid colliding with other objects in the facility, AGV 22 may include a front mechanical bumper 32. Front mechanical bumper 32 is configured to sense any impact with an object and send a signal to AGV 22 which causes the AGV to automatically come to a stop. An optical bumper 34 may also be included that optically scans areas further in front of AGV 22 for obstacles. While AGV 22 is adapted to drive itself without an operator, a person can also override the automatic operation of AGV 22. If such manual use of the vehicle is desired, the user may stand on a platform 36 and control the operation of the vehicle 22 by way of a local operator console 38. The present invention, however, relates to the configuration of an AGV system in which the AGVs operate automatically without the need for any humans on board the vehicles.

Figure 2:
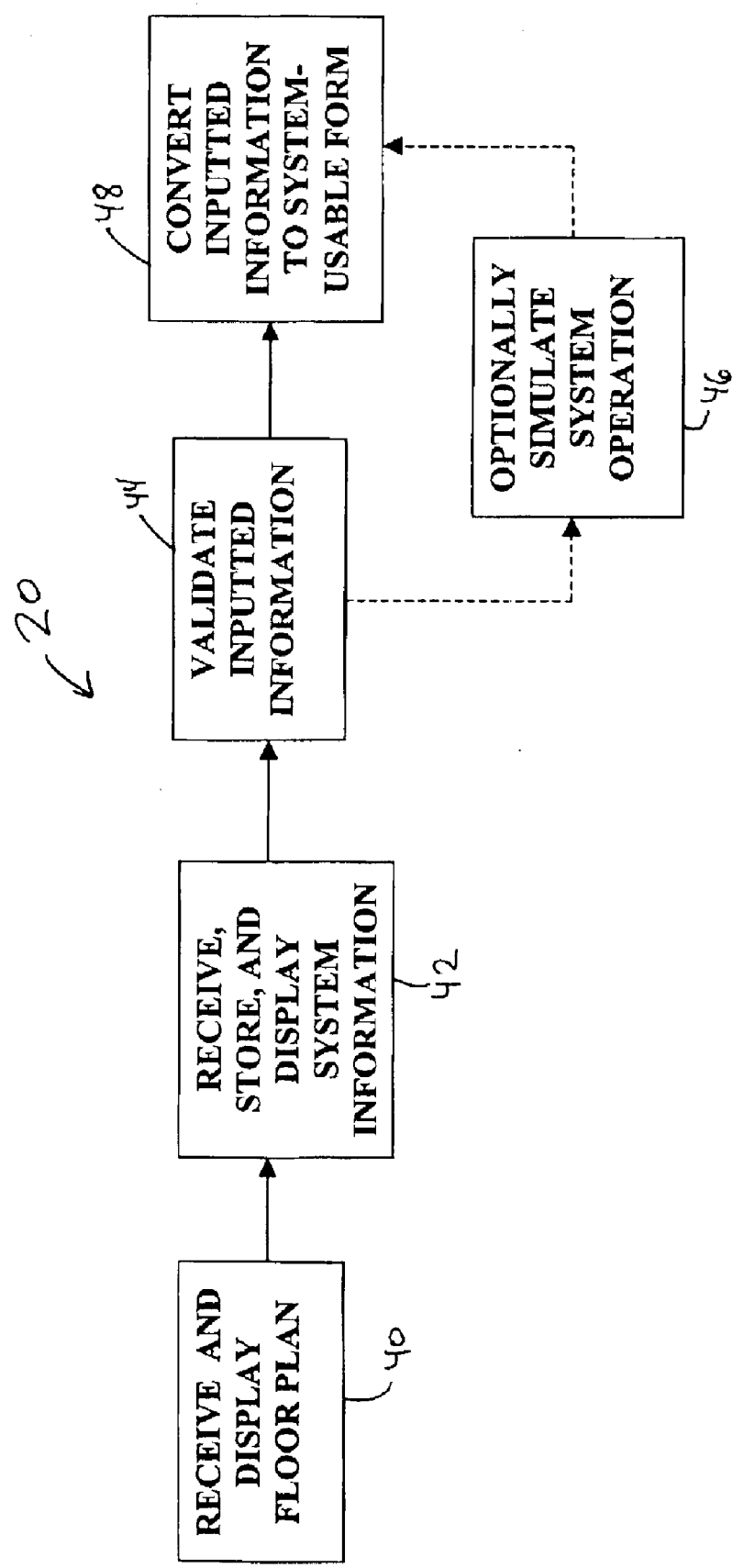
FIG. 2 is a flowchart of the general steps of the method or computer program according to one aspect of the present invention.

Method 20 is illustrated with four general steps (FIG. 2). In a first step 40, a floor plan of the environment in which the AGVs will operate is input into, and received by, a computer. The computer includes a monitor, or other type of visual display, on which it is programmed to graphically illustrate the floor plan. The computer runs a program that operates in a manner that will be described in more detail herein. In a subsequent step 42, information that defines the operation of the AGV system is input into the computer and also displayed graphically. At step 44, the computer program validates the information entered into the computer by checking to see that there are no inconsistencies between various characteristics of the AGVs, the particular installation design, and the floor plan of the facility. Other tests may be performed as well in step 44. In an optional step 46, the user may prompt the computer to perform a simulation of the AGV system according to the information that was input in steps 40 and 42. Finally, at step 48, the information entered into the computer is converted to a format that is usable by the particular AGV system. All four of the steps of the method 20 are described in more detail below.

The computer that is used in accordance with the present invention can be an ordinary personal computer (PC) or other type of computer. Preferably it includes a screen or other type of visual display that allows the floor plan and inputted information to be displayed graphically to the user or users. The computer also preferably includes a computer mouse, a trackball, a touch screen, a graphics tablet, or other similar device to allow information to be entered into the computer. While the present invention finds application to computers using different types of operating systems, the present invention is preferably implemented on a computer running a Microsoft® Windows® operating system. The program by which method 20 is carried out may be written in any computer language, although it lends itself to implementation via object-based languages such as Visual Basic, Visual C++, or others.

Figure 4:
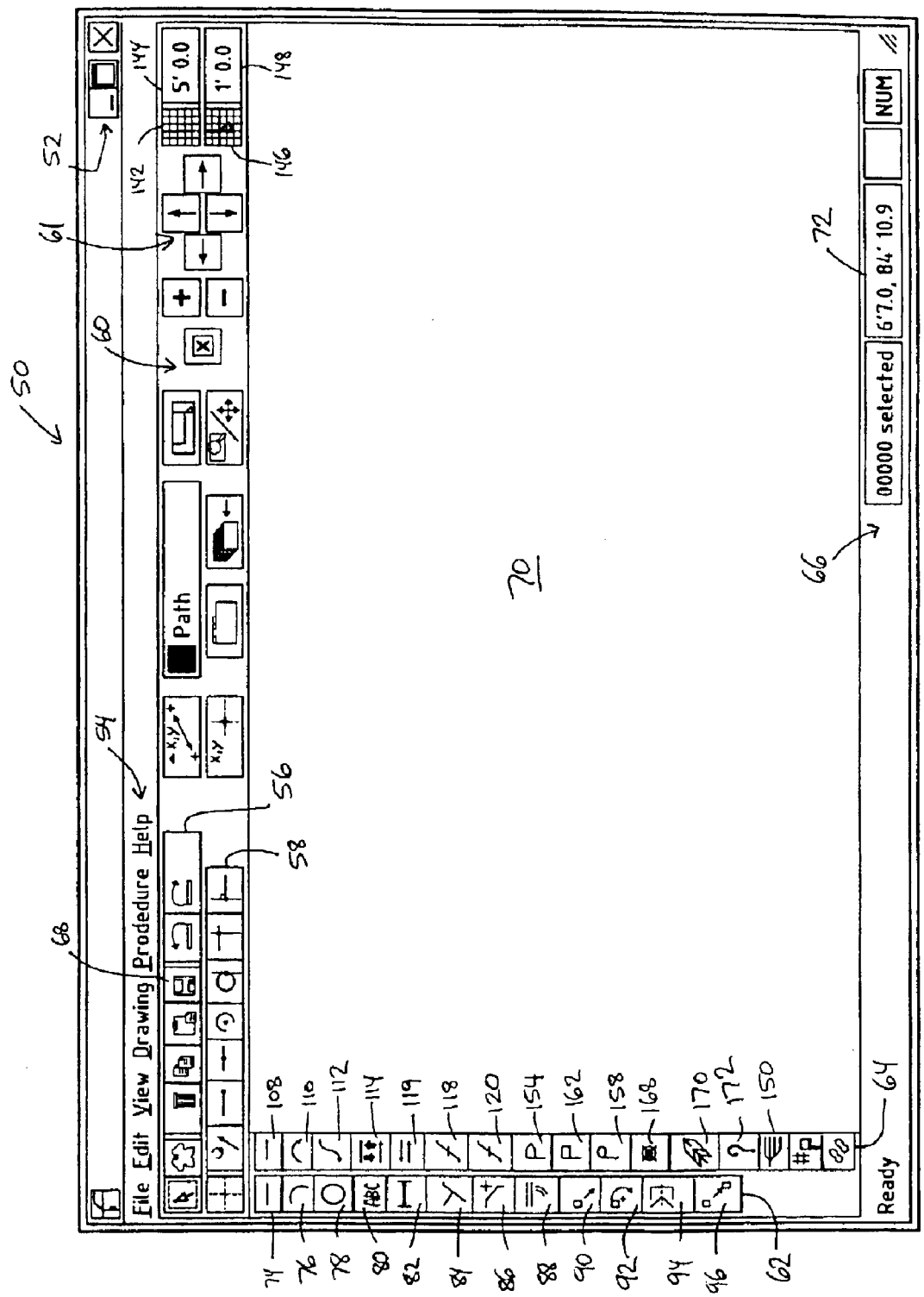
FIG. 4 is a view of a computer screen showing one example of a graphical interface that may be used in accordance with the present invention.

One example of a display or computer screen layout 50 according to the present invention is depicted in FIG. 4. Computer screen layout 50 illustrates what may be visually presented on a computer screen when program 20 initially runs on a computer. Various pop-up windows may appear and changes to this display may occur during the operation of program 20. As mentioned above, program 20 may be run using the Microsoft® Windows® operating system. As such, computer screen layout 50 appears in a conventional window in accordance with Microsoft® Windows® operating system. The window includes conventional control buttons 52 that allow the window size to be minimized or maximized, as well as allowing the program to be terminated. Control buttons 52 are activated in a known manner by moving the computer cursor until it is positioned over a desired one of these buttons and depressing a key or button on the computer mouse, track ball, or other input device. While computer screen layout 50 can vary substantially from that depicted in FIG. 4, the layout depicted therein will be described in further detail as an illustrative example of carrying out the present invention.

Screen layout 50 depicts a number of different toolbars and other items. These include a menu bar 54, a standard toolbar 56, a snap toolbar 58, a view toolbar 60, a drawing toolbar 62, an automatic guided vehicle system (AGVS) toolbar 64, and a status bar 66. Menu bar 54 includes six different menus that are identified as FILE, EDIT, VIEW, DRAWING, PROCEDURE, and HELP. Each of these menus operates in a conventional manner. For example, a user can use a computer mouse or other device to move the cursor over the menu entitled FILE. By clicking the mouse thereon, a menu is visually displayed on the computer screen that includes a number of different options. Alternatively, this menu can be brought up by depressing the "alt" key simultaneously with the letter "f" key on the computer keyboard. Once the FILE menu is displayed, the user can use either the keyboard, or a mouse, or other input devices, to select from the various menu items on the FILE menu. As is conventional, the FILE menu for program 20 may include such menu items as those used to open and close files, print files, preview the printing of files, save files, and exit the program 20. The menu items that may be accessed by way of each of the six different menus displayed on computer screen layout 50, which will be described in more detail in the following written description. In general, the menu items that may be accessed through each of these menus provide access to functions that can also be accessed through the various icons or buttons in the other tool bars displayed on screen layout 50. For example, a save button 68 is depicted in standard toolbar 56. Save button 68 saves the computer file which a user is currently working on. Saving that computer file can alternatively be accomplished by clicking on the FILE menu and then clicking on the "save" menu item that is part of the FILE menu. Most of the other control buttons on the toolbars similarly provide short cuts to functions that alternatively be accessed by clicking on one of the six menus.

In addition to the tool bars discussed above, computer screen layout 50 includes a drawing area 70. Drawing area 70 is used to draw the paths that the automatic guided vehicles, or other material handling vehicles, will follow. It is also used to graphically input other information that allows the material handling system to operate. When a user has finished designing and configuring the AGV system, drawing area 70 will depict a plan view of the paths that the vehicles will follow in a factory, facility, or other environment.

While the operation of the tool bars depicted on screen layout 50 will be described in more detail subsequently, they generally function as follows. Standard toolbar 56 includes buttons or icons for saving and deleting files, un-doing and re-doing actions, copying and pasting entities, and other standard functions. Snap toolbar 58 is used to snap together items that are drawn in drawing area 70. For example, a user may draw a straight section of the path that a vehicle will follow. Subsequently, the user may draw a curved section of the path that is to be attached or contiguous with the previously drawn straight section. In order to insure that the two path segments touch, the snap tool bar 58 can be used to snap together these two segments. The snapping function is the same as that found in conventional CAD programs. The drawing of the individual segments of the paths are carried out by using AGVS toolbar 64. AGVS toolbar 64 allows a user to draw straight segments, arc segments, and a variety of other path entities. The view toolbar 60 allows the user of program 20 to change the view of drawing area 70. For example, view toolbar 60 allows the user to zoom in and out of certain areas of drawing area 70. A plurality of arrow keys 61 allow the user to shift the portions of the AGV design layout that are being displayed in area 70. In some situations, it may be desirable to draw additional entities relating to the factory layout other than vehicle paths. Such additional entities may be drawn using drawing toolbar 62. Status bar 66 includes a location window 72 that instantaneously displays the XY location of the cursor in drawing area 70. This XY location is based on a selected reference point and is measured in any desirable units, such as feet and inches. It should be pointed out that the entities depicted in drawing area 70 are drawn according to the scale of the actual factory or facility in which the vehicles will be operated.

One of the first steps in configuring an AGV system according to method 20 is to load a floor plan into the computer. The floor plan that is loaded into a computer at step 40 is a scale drawing of the facility in which the AGVs are intended to operate. Most companies are in possession of such a drawing or drawings prior to implementing an AGV system. A special drawing therefore does not usually have to be made for this step, although it may be made using conventional methods if necessary. The drawing can be stored in any computer-readable format provided that the computer is programmed to recognize the stored format. The program is preferably adapted to read and process files stored in the conventional (d)rawing e(x)change (f)ormat, which are commonly referred to as .dxf files. However, it should be understood that the program can be designed to accommodate any type of Computer Aided Drawing (CAD) storage file formats or picture file formats, such as .dwg files, bitmap files (.bmp), and other types of files. The floor plan may be loaded into the computer program by clicking on the file menu. As noted, this will bring up a list of menu items. One of these menu items may be labeled "import," or some other similar variant. When the import menu item is selected, the user of the program is prompted to identify the file name and file location of the floor plan. After the user specifies the file name and path, the program reads the floor plan from this file and displays it in the drawing area 70.

The program is preferably designed to display the floor plan in a manner similar to how the floor plan would be displayed in a CAD program. That is, the program includes icons or other user-interface features that allow the user to zoom in and zoom out on selected areas of the floor plan for easier viewing and editing. Some of these icons appear in the view toolbar 60. Other icons on toolbar 60 include tools for switching between an absolute coordinate system and a relative coordinate system; for changing the colors, line thickness, and other preferences for the display of information in area 70; for switching back to previous views; and for controlling other aspects of the display of information.

If no data file of a floor plan of the environment of the material handling system is available, the program of the present invention may also be used to create such a floor plan. Such a floor plan may be created by way of the drawing toolbar 62. Drawing toolbar 62 includes a number of buttons or icons that may be used to facilitate the drawing of a floor plan. All of these buttons are used to draw structures other than the vehicle guidepath. Such structures will be referred to as background objects. One of these buttons is a straight line segment button 74 that may be used to draw the straight line segments in the floor plan. Straight line button 74 is accessed by moving the cursor over button 74 and depressing the mouse button, or another input button. Thereafter, the user moves the cursor into drawing area 70 and positions it at the desired beginning point of the straight line. One of the mouse buttons may then be depressed and the cursor dragged to the location corresponding to the end point of the straight line segment. When the mouse button is then released, the program displays a straight line segment in drawing area 70. Additional line segments may be drawn in the same manner.

Drawing toolbar 62 further includes an arc button 76 which can be clicked on by the cursor to draw arc segments. A circle button 78 may also be included beneath arc 176 for drawing circles. A label button 80 is provided to allow text and labels to be inserted into drawing area 70 in desired locations. A dimension button 82 may be included to allow the dimensions of objects to be easily computed and displayed on drawing area 70. Dimension button 82 may automatically display the distance between beginning and ending points selected by the user. For example, the user might click the mouse button at a beginning point followed by clicking the mouse button at an ending point. Thereafter, the program would automatically display the distance between these two points at a user defined location on drawing area 70.

Drawing toolbar 62 may further include a trim/extend button 84 that can be used to either trim or extend objects drawn in drawing area 70. A fillet button 86 may also be included. Fillet button 86 allows two straight, curved, or combination of straight and curved line segments to be automatically connected together by a curved segment. An offset button 88 allows an object to be copied and reprinted at a desired offset from the original object. A move button 90 allows an entity drawn in drawing area 70 to be moved to a new location. Rotate button 92 allows the user to rotate an object drawn in area 70 a desired amount by simply clicking on the entity and then specifying the degree of rotation. A mirror button 94 allows the mirror image of an entity to be automatically created. If a user simply clicks mirror button 94, uses the cursor to define the starting point and ending point of a mirror line, and then prompts the computer to display the mirror image of a selected entity. A duplicate button 96 allows the user to duplicate drawn objects in area 70 by simply clicking on them and then clicking the mouse when the cursor has been moved to the location where the duplicate object is to be displayed.

It should be understood that the buttons provided as part of drawing toolbar 62 can be varied substantially from that discussed herein. Further, it should be understood that the invention can be practiced without any means for drawing a floor plan. For example, the program of the present invention could operate where the floor plan has to be drawn in a separate CAD program. The inclusion of drawing toolbar 62 simply adds versatility to the program by allowing the user to use the same program to create the floor plan. As mentioned previously, drawing toolbar 62 is used to draw background objects and entities that are not part of the paths followed by the automatic guided vehicles. These background objects may include the walls of the facility, obstructions within the facility, and a variety of other objects.

Figure 5:
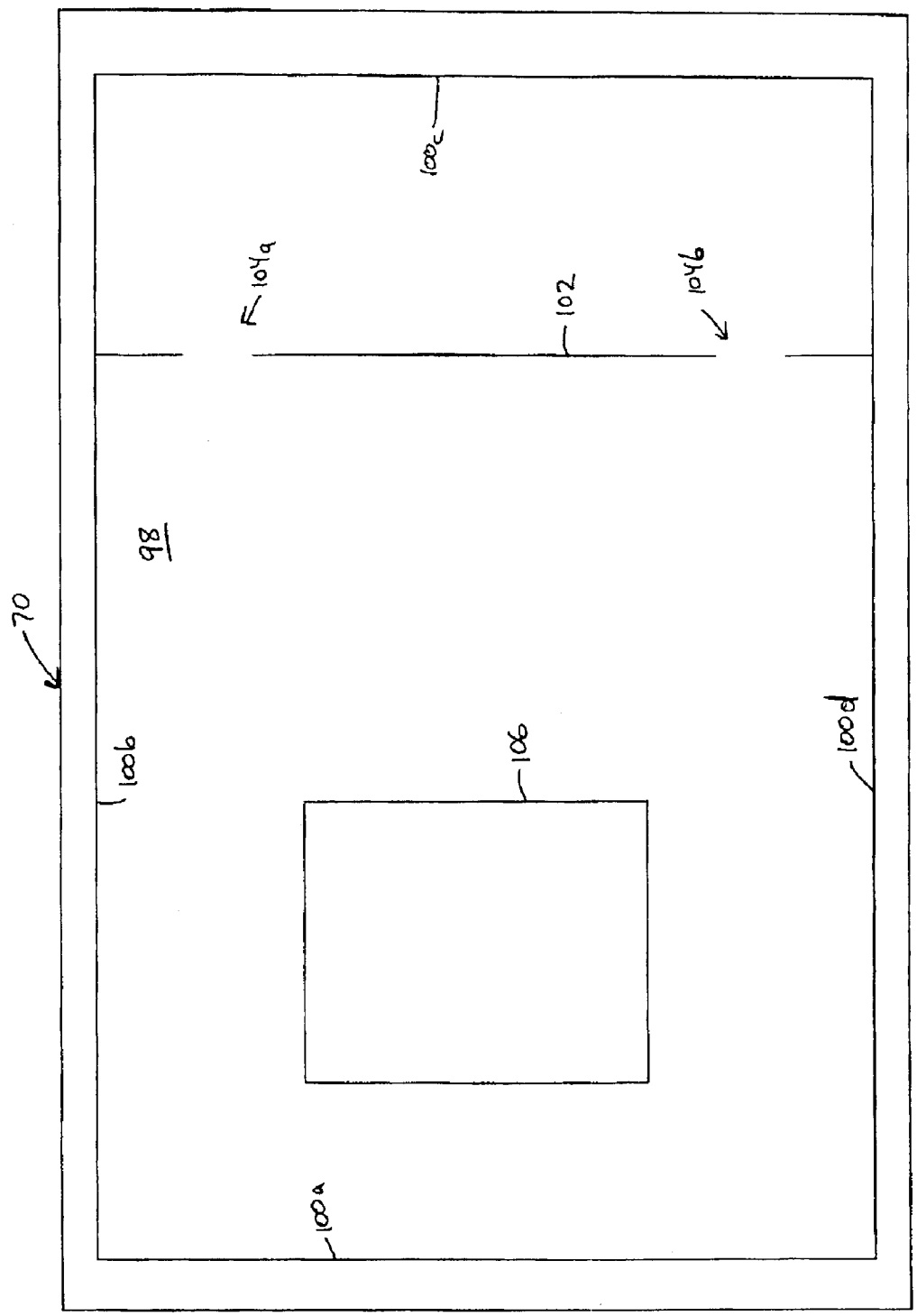
FIG. 5 is a plan view of an illustrative floor plan of an environment for an AGV system.

An illustrative example of a simple floor plan 98 that defines an environment for an AGV system is depicted in FIG. 5. FIG. 5 depicts only the drawing area 70 of screen layout 50. It will be understood that the toolbars and menus described above and depicted in FIG. 4 are still included as part of the screen layout, despite their absence in FIGS. 5–10. The removal of these items in FIGS. 5–10 has been done to help clarify the following written description.

Floor plan 98 includes four outside walls 100a–d, an internal wall 102 that defines two passageways 104, and an obstacle 106. While floor plan 98 is not drawn to scale in FIG. 5, the floor plan that is loaded into the computer in step 106 is a scale drawing. Much more complex floor plans than that shown in FIG. 5 can be used in accordance with the present invention. Whatever floor plan drawing that is used should include any walls, machines, storage racks, or other objects that indicate locations in which an AGV cannot travel. If the floor plan loaded in step 106 is a drawing that was originally made for other purposes and includes additional entities that are not actually obstacles to the AGV, or otherwise of concern to the AGVs, program 20 is adapted to allow these objects to be either removed from the displayed floor plan, or not stored as part of the converted file created in step 48.

Figure 3:
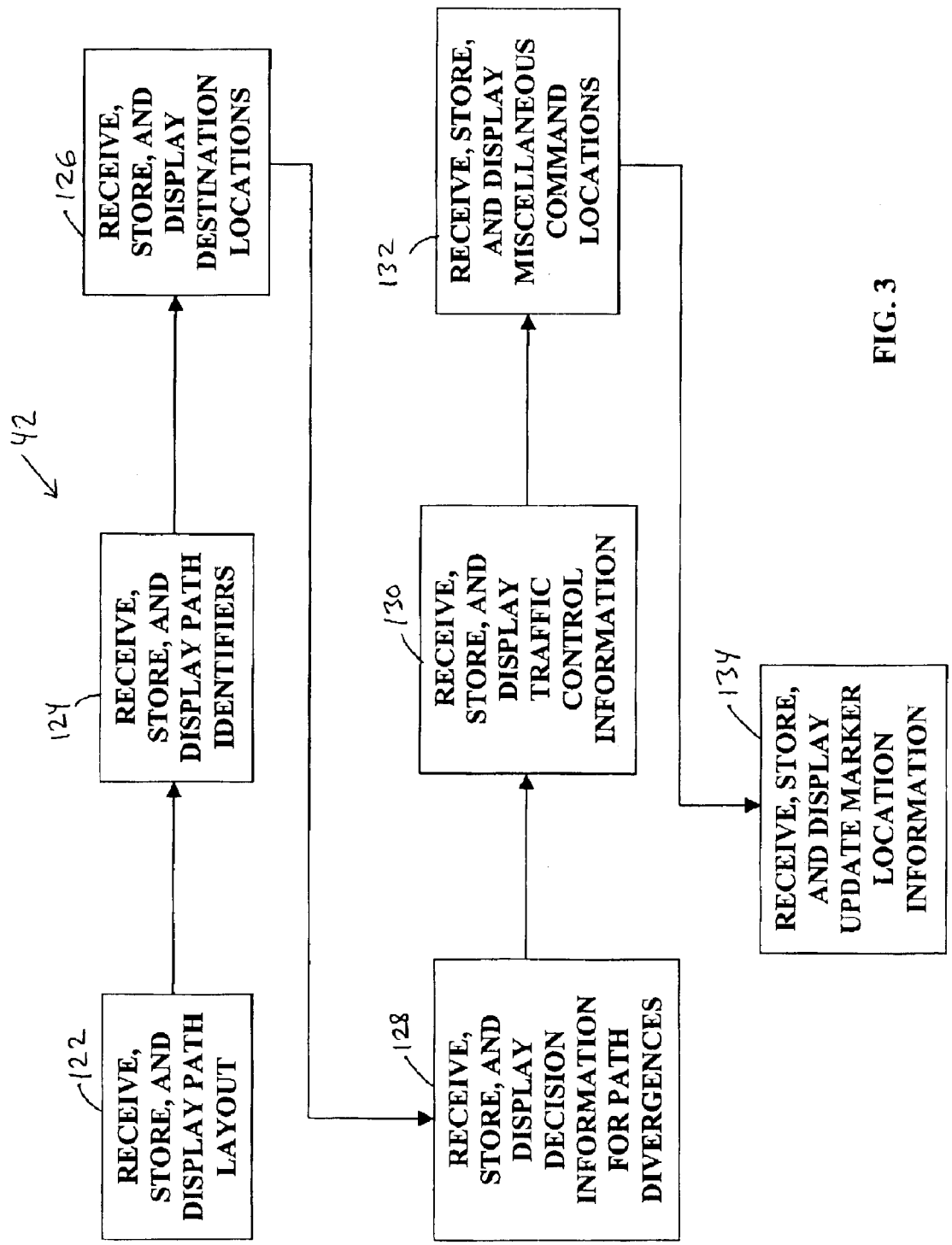
FIG. 3 is a detailed flowchart of the processing steps undertaken by the computer program in the second step of the flowchart of FIG. 2.

At step 42, the user of computer program 20 inputs the information necessary to define the AGV system. The different types of information that are input in this step are shown schematically in FIG. 3. FIG. 3 illustrates seven different steps of inputting information into the computer. It should be understood that the order in which these seven steps are illustrated in FIG. 3 can be varied from that illustrated. As one example, FIG. 3 illustrates the entry of update marker position information in a step 134 that occurs after the entry of data in steps 122–134. This update marker position information could be input prior to steps 122–134, or as an intermediate step interspersed within these six other steps. Other changes to the order of the steps can also be made. For purposes of convenience, however, steps 122–134 will be described in numerical sequence in detail below. Additionally, while all of steps 122–134 are described below, it should be understood that one or more of these steps can be omitted, based on the particular requirements of a given system design.

The steps 122–134 may perhaps be more easily be understood by use of an analogy. The method of configuring a material handling system according to the present invention can be compared to a method for creating a highway system for automobiles. In a first step 122, the paths for the automatic guided vehicles are defined. This is generally comparable to constructing the roadways or streets down which automobiles may run. In a second step 124, the guidepaths for the AGVs are identified. This is generally comparable to providing highway numbers or street names to roads that were previously built. At step 126, destinations along the vehicle guidepaths are identified and positioned. This is comparable to identifying locations on a road map where cars may travel to and from. At step 128, decision points are input into the computer. These decision points enable the vehicle to decide which path to follow where there is a fork or branch in the path. The decision points thus function in a manner generally comparable to street signs that appear at street intersections and that tell the drivers of vehicles which way to turn to get to selected destinations. At step 130, traffic control information is input into the computer. This traffic control provides a similar function to that of traffic lights and stop signs at street intersections. In general, it serves to prevent vehicles from colliding. Step 132 allows the input of additional miscellaneous information. Depending on the specific type of miscellaneous information input, analogies may be drawn to the street and automotive example described herein. At step 134, the location of update markers are input into the computer. This step may generally be analogized to the creation of mile markers along highways, or other signs or markers that identify the automobiles current position. The details of how each of these steps are accomplished are described in more detail below.

The information input into the computer at step 122 is the information that defines the location and layout of the guidepaths that the one or more AGVs will follow. While there are a variety of different ways in which such information can be defined and entered into the computer, the program is preferably designed to allow this information to be entered graphically in a manner similar to which conventional CAD programs allow a user to draw items. In other words, while the computer is displaying the floor plan entered at step 106, the program is designed to allow a user to move the cursor—via the mouse, the keyboard, or both— to desired locations in drawing area 70 and draw lines that define the AGV guidepath on the floor plan.

The program preferably, although not necessarily, includes many of the drawing tools found in conventional CAD programs, such as line, arc, and circle drawing tools, as well as tools for finding the midpoint of lines, drawing tangents and perpendiculars, snapping objects to other objects, drawing fillets, trimming objects, and other useful functions that simplify the drawing process. Many of the functions that are used to simplify the drawing of vehicle paths can be found in AGVS toolbar 64. AGVS toolbar 64 includes a straight segment button 108 that causes a straight line segment to be displayed between starting and ending point defined by the user in drawing area 70. Specifically, the user can create a straight segment simply by clicking the cursor over button 108 and then clicking the cursor at the desired starting point in drawing area 70. The user then moves the cursor to the desired ending point in drawing area 70 and clicks the mouse button, or other input device, once again. A straight line segment is then displayed in these starting and ending points. A curved segment button 110 may be used to draw curved path segments in drawing area 70 in a similar manner. A continuous segment button 112 automatically concatenates straight and curved line segments drawn by the user in area 70. Stated alternatively, the user simply clicks the mouse button in the desired location in area 70 after depressing the continuous button 114. This first location defines the beginning point of a straight line segment. Whatever location the user moves the cursor to and thereafter clicks the mouse button defines the end point of a straight line segment. Whatever location the user next moves the cursor to and then clicks the mouse button defines the end point of another straight segment that is automatically connected to the previous straight segment by way of an intermediate curved segment. This alternation of concatenated straight and curved guidepath segments continues for as long as the user desires.

A convert button 116 is also provided as part of AGVS toolbar 64. Convert button 116 converts a selected entity from a background object to a path object, or vice versa. As mentioned previously, those objects which are drawn in area 70 by way of drawing toolbar 62 are considered background objects. These background objects are not used by the AGV during its operation. If a user of the program wishes to convert any of these background objects into pathways for the AGV, he or she can simply click the mouse button while the cursor is positioned over the desired object and then click on convert button 116. Convert button 116 causes the selected object to be converted from a path object to a background object, or vice versa. As will be explained in more detail below, the path objects define the paths that the AGVS will follow in a facility. These path objects are therefore used by the AGV system, while the background objects are merely included in drawing area 74 for reference purposes.

Figure 6:
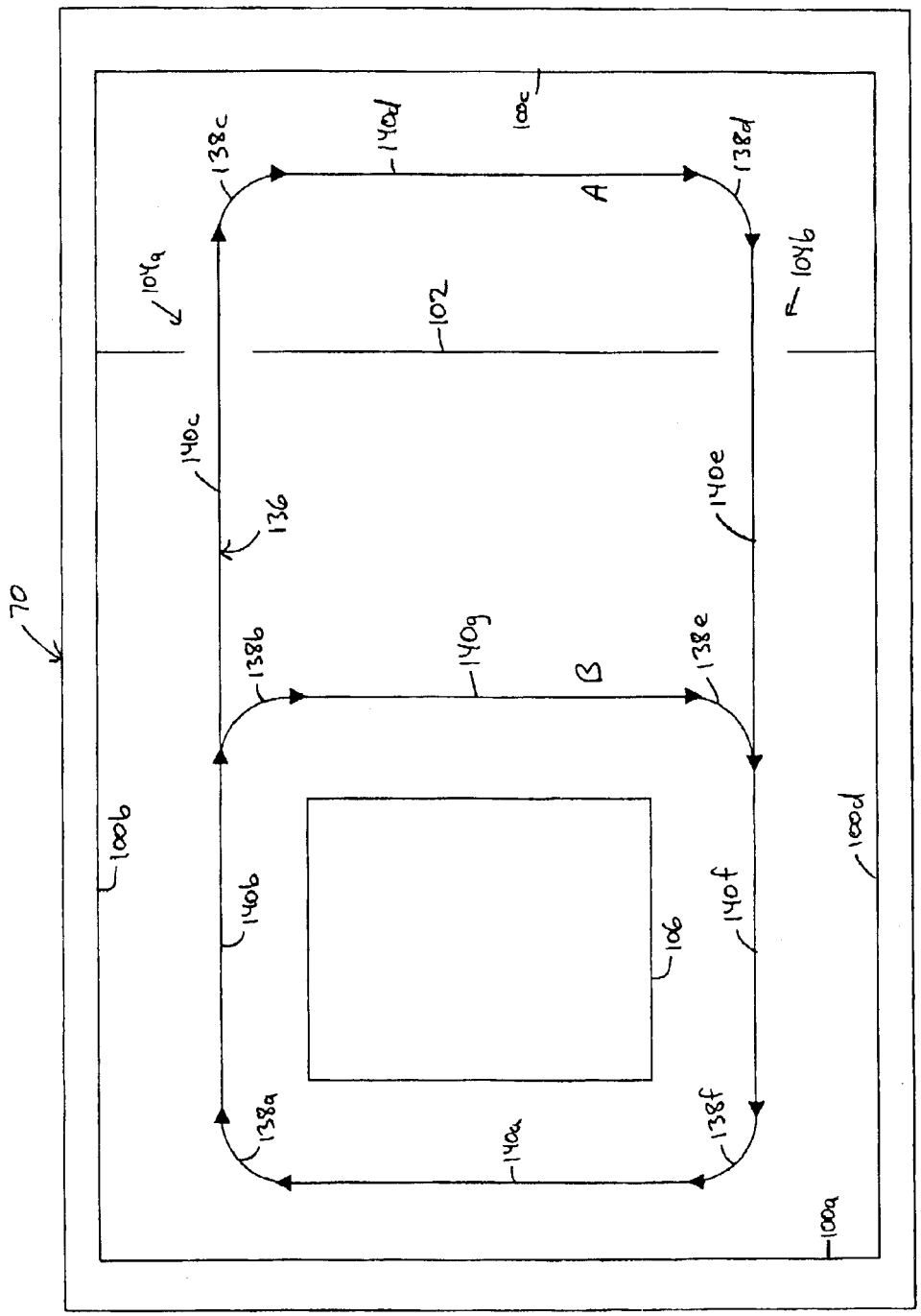
FIG. 6 is a plan view of an illustrative example of a path layout in the floor plan of FIG. 5.

A separate button 118 separates a path straight line segment, or path curved segment, into multiple straight or curved segments. For example, if a straight path segment is depicted in drawing area 70, clicking on separate button 118 followed by positioning the cursor at a desired location on the straight line segment and clicking the mouse will cause the straight line segment to be separated into two straight line segments at the point where the cursor was located when the mouse button was clicked. Similar separation of arcs can be accomplished using the separate button 118. A join button 120 operates in an opposite fashion as separate button 118. Join button 120 will convert two collinear straight path segments into a single straight line path segment. The join and separate buttons allow easy modifications to be made to guidepath segments where divergences or convergences are later to be added or deleted. As illustrated in FIG. 6, the path segments are illustrated with arrows indicating the direction of vehicle travel. If any of these segments are accidentally defined with the wrong directionality, a reverse button 119 can be clicked to change the direction of a selected path segment.

As illustrated in FIG. 4, snap toolbar 58 includes a plurality of buttons that allow different types of snapping of objects drawn in area 70. Specifically, snap toolbar 58 includes eight different snap buttons. Beginning on the left, and moving towards the right, these snap functions are as follows; no snap, snap to nearby object, snap to end point, snap to midpoint, snap to center, snap to tangent, snap to crossing, and snap to perpendicular. All these snap functions operate in a conventional manner, commonly used with known CAD programs. Accordingly, they will not be described further herein. Suffice it to say, they facilitate the drawing of the pathways for the automatic guided vehicles by automatically connecting path segments together in the specified manner.

FIG. 6 illustrates an example of a guidepath 136 entered into the computer and displayed in area 70. Guidepath 136 includes a number of arc segments 138 and straight segments 140 connected to each other to form a pair of looping paths. The computer program allows guidepath 136 to be entered into the computer simply by choosing whether to draw an arc or a line segment, and then mouse clicking at the beginning and ending points of the chosen arc or line segment. The above-mentioned tools can be used to snap segments together and to otherwise facilitate the drawing of the guidepaths. The computer program scales the path segments that are entered to the same scale as that of the floor plan 98 so that what is visually displayed on the computer screen is an accurate representation of the length and location of the guidepath in the intended facility. The computer program is designed to simultaneously display both guidepath 136 and floor plan 98 on the computer monitor in drawing area 70. The computer program stores the location of the drawn line and arc segments with reference to a coordinate system, or other frame of reference, that is shared by the floor plan so that the designed AGV system will match the facility.

While not illustrated in any of the figures, drawing area 70 may optionally include a background grid that can be used as a visual aid to drawing both background objects and path objects. The control of the display of the background grid is carried out by way of a grid button 142. A background grid button 142 is a toggle switch that toggles between displaying the background grid and not displaying the background grid. A background grid size button 144 is positioned adjacent grid button 142. Depressing the background grid size button 144 allows the spacing between the background grid lines to be changed. As illustrated in FIG. 4, each grid line is separated by five foot scaled distance. A grid snap button 146 is positioned below background grid button 142 and allows lines and arcs in drawing area 70 to be snapped to a grid when this button is depressed. This snap grid is independent of the background grid and may or may not change the size of the snap grid. A snap size button 148 can be depressed to change the size of the snap grid. When the snap grid feature is enabled, mouse movements of the cursor are restricted to movements specified by button 148 and any objects drawn are limited to being sized in those increments. The snap grid is not displayed in drawing area 70, unlike the background grid, which may be displayed.

After one or more path segments have been entered into the computer, identifiers for the path segments may be entered at step 124. (FIG. 3). Such path identifiers are used for controlling which way an AGV will turn at a path branch or divergence. The identifiers can take on any form, but can be easily implemented by using simple numeric or alphabetic identifiers. In the example of FIG. 6, there are a number of different ways of identifying the individual path segments. The identifiers are used to allow the vehicle to follow the correct path at these branches. The identifiers can be entered into the computer in any convenient fashion. For example, an icon could be included on the computer display that, when mouse clicked, identifies each path segment that is subsequently mouse-clicked with a particular path identifier. Alternatively, right clicking or double clicking on a given path segment could bring up a menu that allows a path identifier to be entered through the keyboard. A wide variety of other methods for inputting the path identifiers could be used. Once these identifiers have been entered, they may be displayed on the computer monitor. Again, there are a wide variety of different manners of accomplishing this. Color coding or simple placement of the identifier next to a segment are but two of many options that could be used.

The identification of different paths can also be carried out by clicking the path mode button 150, or entering the path made by way of a menu item listed under the PROCEDURE menu. In the path mode, the user can simply move the cursor to a selected path segment and click the mouse button. This clicking will bring up a window that allows that particular path segment to be assigned a path identifier. In the example of FIG. 6, each path segment around the periphery of the guidepath loop could be assigned the path identifier "A." The segments 138*b*, 140*g*, and 138*e* could be defined as path "B." Numeric or other types of identifiers could alternatively be used.

Individual path segments could be assigned more than one identifier, if desired. For example, segments 140*f*, 138*f*, 140*a*, 138*a*, and 140*b* could all be identified as part of both paths A and B. In this case, both paths A and B would define complete loops: path A comprising all the segments except 138*b*, 140*g*, and 138*e*, and path B comprising segments 138*b*, 140*g*, 138*e*, 140*f*, 138*f*, 140*a*, 138*a*, 140*b*, and 138*b*. For purposes of the following description, this definition of paths A and B will be used.

Figure 7:
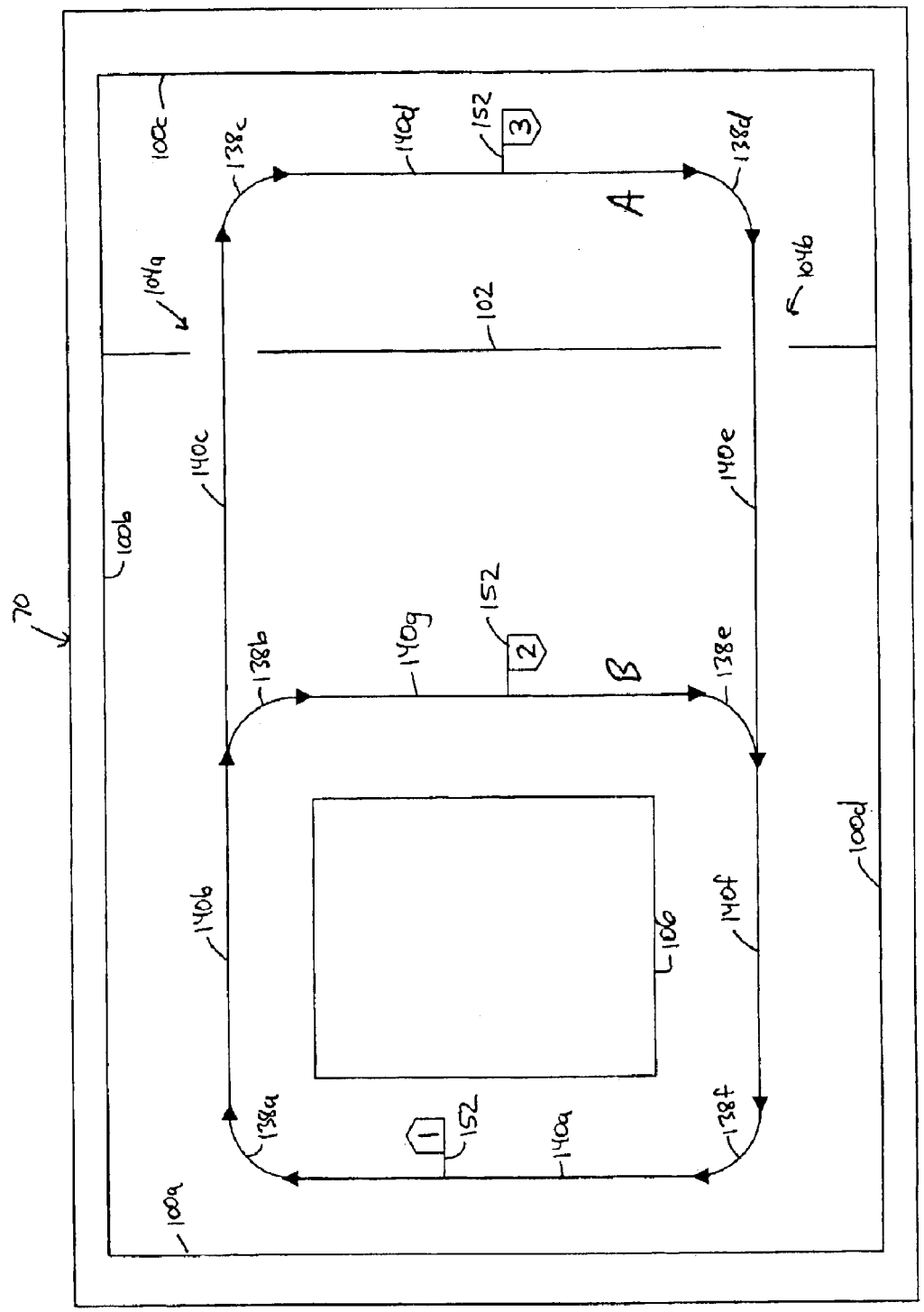
FIG. 7 is a plan view of the path layout of FIG. 6 shown with destinations added.

At step 46 the locations of AGV destinations are entered into the computer. The AGV destinations are the locations within the facility where the AGV can be told to travel to. These are typically locations where the AGV will either be loaded or unloaded with material, but could also include locations where the AGVs' batteries are re-charged, where the AGVs are serviced, or where other activities take place. The computer program of method 20 allows these destinations to be entered graphically by placing a destination symbol at the desired location. FIG. 7 illustrates three destinations that have been added. These destinations are labeled 1, 2, and 3, and are marked by a destination symbol 152 that resembles a pointed flag. The particular symbol used to mark destinations can be anything.

One way in which the program allows these destination symbols to be entered is through a destination button 154 that, when clicked, places a destination at whatever location the cursor is in area 70 when a subsequent mouse click occurs. This destination-placing process can continue until another button is selected. The conventional snap feature may be used so that these destination symbols 152 can be more easily placed in locations that are actually attached to guidepath 136. After the destinations are entered, an identifier must be given the destinations, such as a numeric identifier, or some other identifier. The inputting of this information can be accomplished in the same manner that the path identifier information is entered, as described above. Alternatively, a window can open up after a destination location has been input in which the destination ID can be entered. The destination identifiers are used to allow the system to differentiate between different destinations. The computer program stores the location and associated identifiers for each destination entered.

Figure 8:
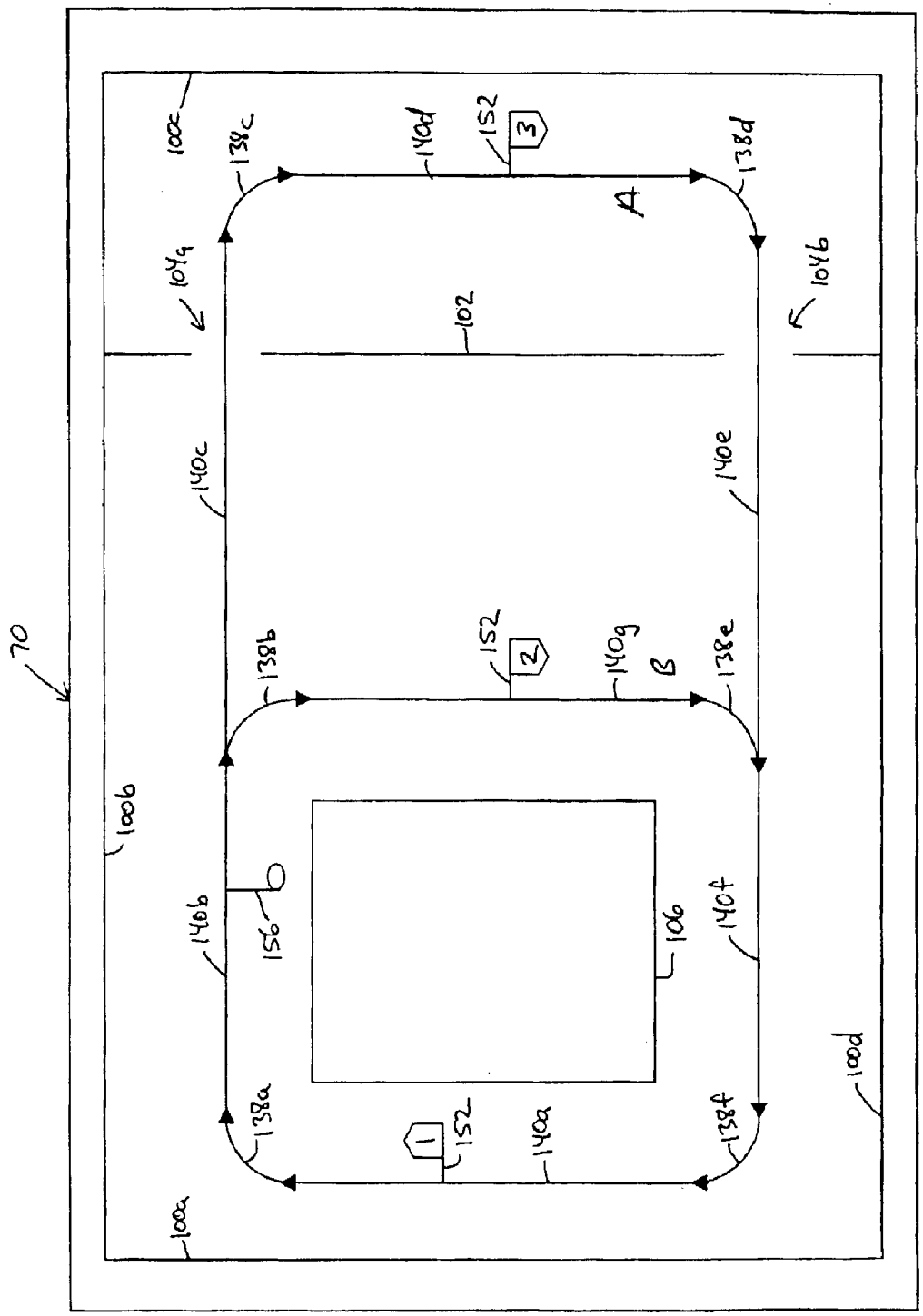
FIG. 8 is a plan view of the path layout of FIG. 7 shown with a decision point added.

At step 128 decision point information is entered into the computer. Decision points are places along the guidepath at which a decision has to be made as to which branch in the path the vehicle is to follow. Stated alternatively, decision points are placed prior to each fork in the path. A decision point symbol 156 is depicted in FIG. 8. It is located right before the divergence of paths B and A, which lead to destinations 2 and 3, respectively. In the guidepath 136 depicted in the accompanying drawings, it is assumed that the AGVs only move in a clockwise direction around the loops of the guidepath. It is, of course, possible to have AGVs move along the guidepaths in an opposite direction, or even in a bi-directional manner. If the guidepath 136 were a bi-directional guidepath, then another decision point should be placed towards the bottom of the floor plan so that the vehicles would choose the right path to get to either destination 2 or 3.

Decision point symbols 156 may be placed at the desired locations on the floor plan by clicking on a decision point button 158 in AGVS toolbar 64 and then clicking at the desired location of the decision point in area 70. In addition to simply placing the decision point symbols 156 at desired locations, program 20 must be given additional information for each decision point. First, each decision point is given an identifier. Second, the user of program 20 must input the control logic that will be followed to determine which branch the vehicle will follow at the path fork. One manner of implementing this control logic is a destination-based solution. That is, the path which the vehicle will choose at any given branch is based upon which destination a vehicle has been assigned to. For example, decision point 156 in FIG. 8 would include instructions to take path B if the vehicle were assigned to travel to destination 2 and to take path A if the vehicle were assigned to destination 3. For each decision point, the user inputs which of the multiple branches following the decision point should be taken for all of the different destinations. When a vehicle arrives at a particular decision point, the information stored for that particular decision point is consulted to see which branch the vehicle should follow (based on its assigned destination).

If this destination-based control logic is utilized, the necessary information can be input into program 20 in a wide variety of different ways. For example, the user could simply mouse click on any given decision point symbol 156. This clicking could bring up a menu which identifies which paths are associated with that particular decision point. The menu could further include a text box or other tool that allows a user to type, or mouse click, in which destinations are assigned to which paths for that decision point. The decision point logic could also be entered by entering the path mode described above, and then clicking on the path divergence associated with the decision point. This could highlight all of the destinations with a specific color corresponding to the path to be taken at that divergence to reach that destination. The user could then click on the destinations to make any changes as to which path branch the vehicle should follow to get to that destination. The computer program stores the decision point information that is entered for later use, as discussed more below.

In addition to destination-based control logic, the present invention finds equal application to other sorts of control logic. For example, it may be desirable to control which way a vehicle turns at a path branch based upon factors other than the vehicle's destination, such as the type of material the vehicle is carrying, the particular type of vehicle, the location of other vehicles, or other factors. It may further be desirable to mix the destination-based control logic with one or more of these other types of control logic. Program 20 is adaptable to any of these various type of control logic, or mixtures thereof.

Figure 9:
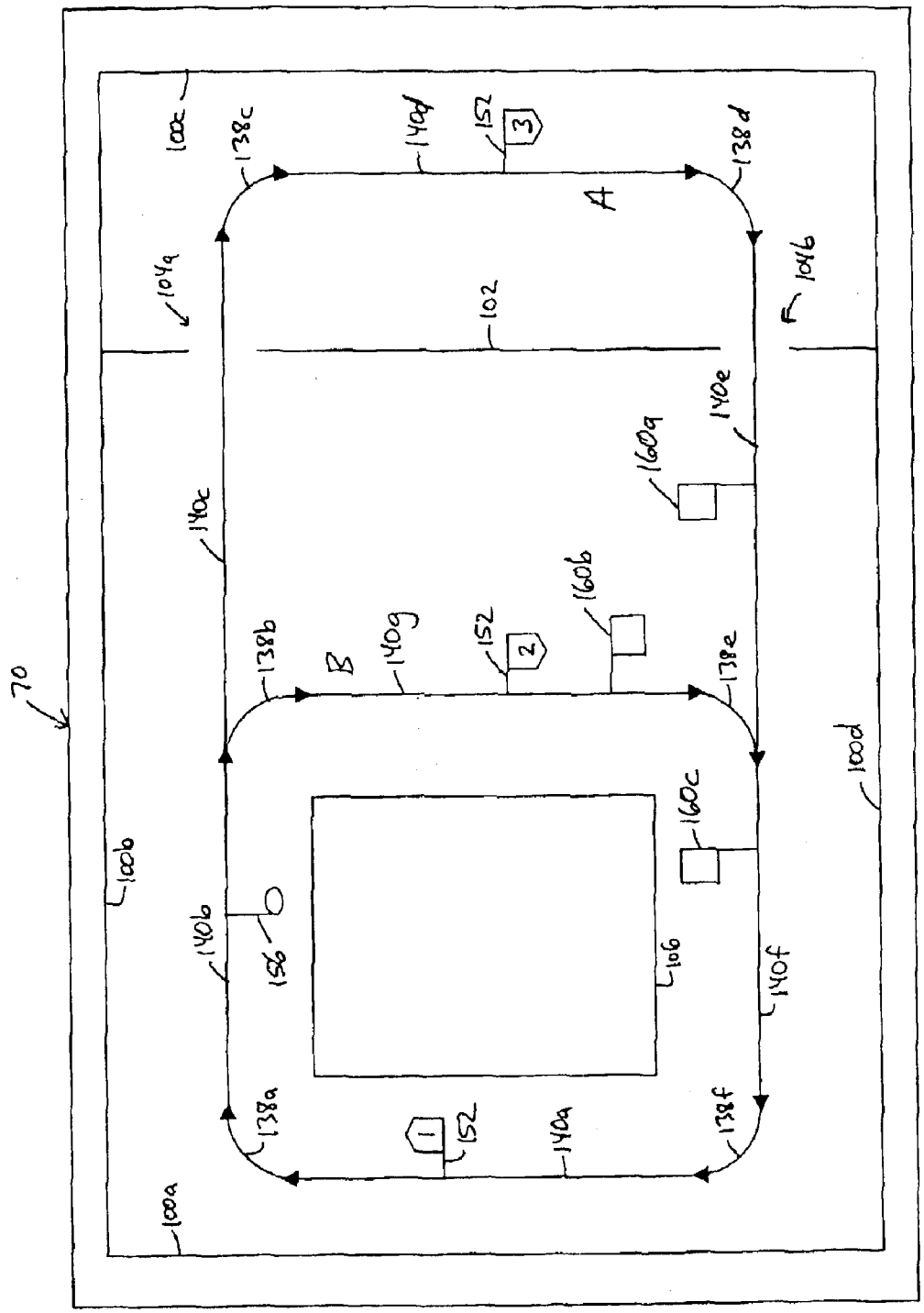
FIG. 9 is a plan view of the path layout of FIG. 8 shown with traffic control points added.

At step 130, traffic control information is input by a user into program 20. The traffic control information is input by way of placing traffic control symbols 160 at desired locations. Most often, these traffic control symbols are placed prior to path intersections or mergers. However, such symbols can be used in any area where it is desired to have only a single vehicle present at a given time. In FIG. 9, for example, traffic control symbols 160 have been added adjacent to the merging of paths A and B. One symbol 160a is placed on path A prior to the merger with path B. Another symbol 160b is placed on path B prior to the merger with path A. And another symbol 160c is placed downstream of the merger of paths A and B. The section of path A between symbols 160a and 160c, as well as the section of path B between symbols 160b and 160c, constitute a particular zone. These symbols may be placed by clicking traffic symbol button 162 and then mouse-clicking area 70 when the cursor is at the desired location.

After the symbols defining this zone are properly placed, symbols 160a and b are identified as zone-beginning points while symbol 160c is identified as a zone-ending symbol. Further, the zone defined by these symbols is given an identifier. The user identifies symbols 160a and b as zone-beginning symbols in any user-friendly manner, such as by clicking on the symbols to bring up a menu in which the different types of zone symbols are listed and can be selected. The user can identify symbol 160c as a zone-ending symbol in the same way except by selecting that particular type of symbol, rather than a zone-beginning symbol. Alternative methods of inputting this information are also possible, such as simple numeric coding, or other methods. The traffic control symbols are preferably placed sufficiently upstream of a path divergence to allow sufficient time for a vehicle controller to process the traffic control symbol and bring the vehicle safely to a stop if the zone is already occupied.

The zones defined by traffic control symbols 160 are used to ensure that vehicles do not collide with each other at intersections or mergers. In FIG. 9, traffic control symbols 160a–c ensure that a vehicle on path A does not collide with a vehicle on path B where the two paths merge. Depending on the type of AGVs and the manner in which they are controlled, additional traffic control symbols may be added to the paths via program 20. For example, in addition to the zone-defining symbols 160 discussed above, it may be useful to input additional traffic control symbols at locations where a vehicle is to claim a particular zone. For example, after a vehicle passes by traffic signal 160b, it will know it is in the particular zone defined by this symbol. In some vehicle systems, a check will be made to see if any other vehicles are currently in that zone and, if not, the vehicle will claim that zone until it exits at point 160c. In such a case, it may not be desirable to include any additional traffic control symbols 160. However, in other vehicle systems, it may be desirable to delay the point at which a vehicle claims a zone after entering it. This zone-claiming point could be entered into the program in the same manner as traffic control points 160 are. Information would then be input to distinguish this type of traffic control point from the other types of points. Regardless of the number of different types of traffic control points that are used, the computer program displays these points visually and stores their location and associated identifiers.

Figure 10:
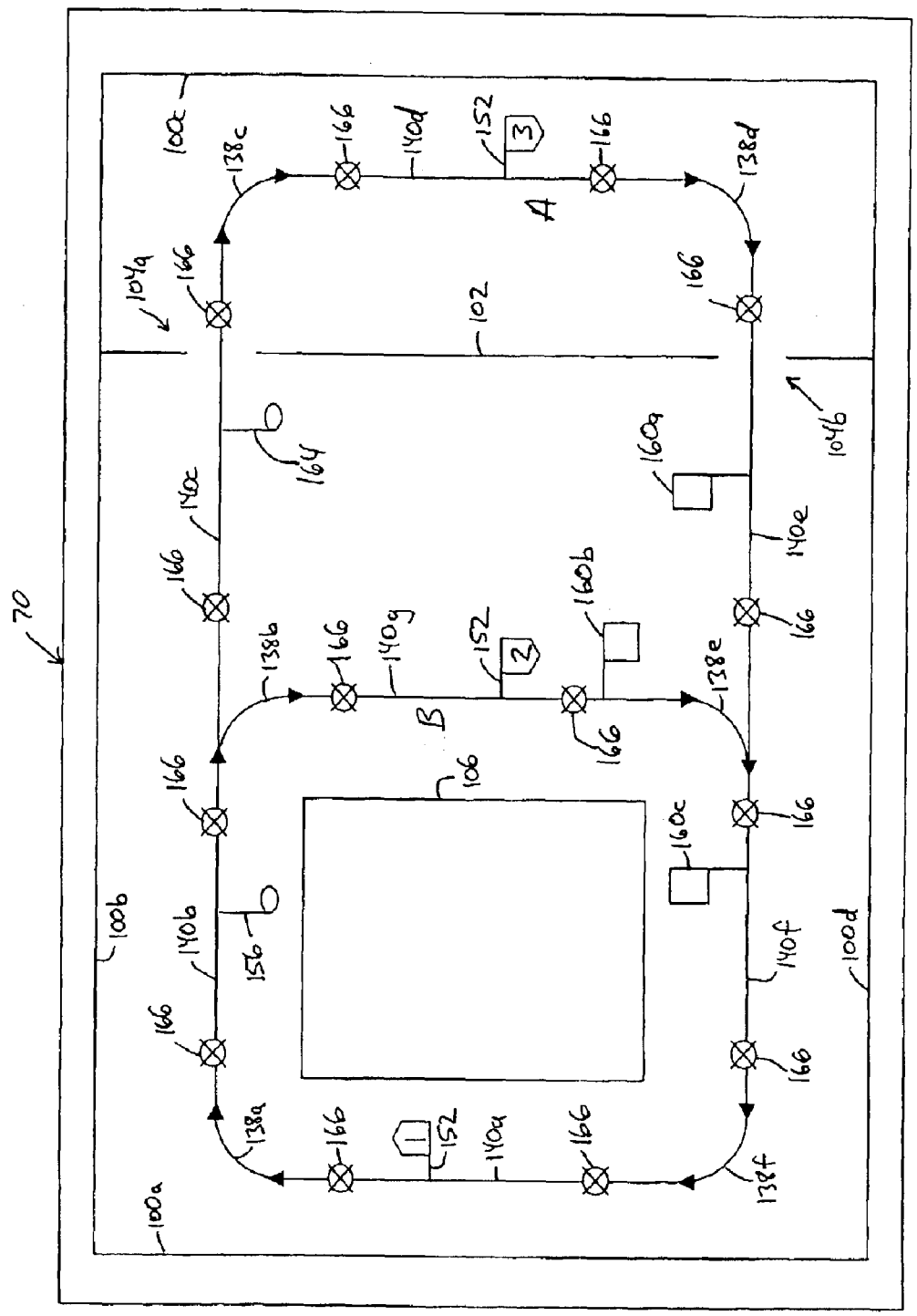
FIG. 10 is a plan view of the path layout of FIG. 9 shown with update markers and a command point added.

At step 134, various miscellaneous command points can be entered into the computer. An example of a command point 164 is illustrated in FIG. 10. Command point 164 is illustrated therein with the same symbol used to designate decision points. Other symbols could be used, if desired. Command point 164 simply defines a location at which a vehicle is to be given a specified command. For example, it may be desirable to have any vehicle that reaches command point 164 to blow its horn at this location so that personnel on the opposite side of interior wall 102 are alerted to the impending arrival of an AGV. Alternatively, it may be desirable to have the vehicles change speed at command point 164. Still other types of commands may also be desirably implemented at point 164. The computer program is adapted to accommodate these various types of commands. The various actions that may be undertaken by the vehicle can each be assigned a unique numeric code. When a command point 164 is entered into drawing area 70, a menu of the available commands may be brought up in a window, such as speed changes, horn blowing, indicator lights, path switching etc. With each command point entered, the user simply selects from this menu to have a particular type of command associated with a particular command point. The computer program 20 stores the location of all of the entered command points, as well as the particular commands associated with each point.

Another type of miscellaneous information that may be entered in step 132 includes specifying the location of initialization points. Initialization points are locations within the facility, factory, or other environment at which a vehicle is initially introduced into the AGV system. More specifically, these are locations where the vehicle can coordinate its current position with the position of the guide path layout that is created using program 20. In essence, the initialization points allow the vehicle to match its actual, physical location within a facility to the computer file containing the stored coordinates of the guide paths and other path entities. Once the initialization process has taken place, the vehicle does not ever need to be initialized again in the absence of a power loss, a guidance system failure, or some other such event. Initialization points typically include a unique configuration of update markers that the vehicle senses its position with respect to. These update markers may include laser targets, magnets, transponders, reflective tape, or any other type of markers. The location of the initialization points can be easily input into program 20 by way of an initialization point (IP) button 170. IP button 170 is illustrated in FIG. 4 as part of AGVS toolbar 64. Moving the cursor over IP button 170, clicking the mouse, and then dragging the cursor to a desired location causes an IP symbol to be displayed at the location in area 70 where the mouse button is next clicked. Program 20 stores the location of all of the initialization points that are graphically input into drawing area 70.

In addition to the initialization areas, it is typically necessary to place update markers throughout the entire facility in most wireless AGV systems. These update markers are typically placed at fixed, known locations throughout the facility and sensed by the AGV as it travels. The vehicle detects its position with respect to one or more of these update markers and uses this information, along with the known position of the markers, to determine its location within the environment. The update markers may comprise magnets or transponders buried in the floor, laser reflectors which reflect laser light emitted by the AGV, ultra-wideband transmitters that use time-of-flight information to determine position, or other types of update markers. The present invention finds application to any of these types of update markers, as well as others. The use of ultra-wideband transmitters as update markers for material handling systems is described more completely in commonly assigned, co-pending application Ser. No. 10/209,766 entitled Material Handling Systems With High Frequency Radio Location Devices, filed Jul. 31, 2002, the disclosure of which is hereby incorporated herein by reference.

At step 134 the location of the update markers are input into the computer. These may be input manually by the user using an update marker button 168 in AGVS toolbar 64. Alternatively, these locations may be input by reading information from another computer file that includes the locations of all of the update markers. Such a computer file would generally be created because it is often easier to install the update markers at their generally desired location and then survey their precise position after installation, rather than first picking a location and then trying to install them precisely at that selected location. Regardless of whether the update markers have actually been installed in the facility or not, the computer program of the present invention allows their location (whether actual or intended) to be input into the computer. An update marker symbol 166 is visually displayed by the computer at the location of each update marker. (FIG. 10). In the example of FIG. 10, the update markers are positioned right on, or alongside, the guidepath 136. Such update markers may be magnets or transponders buried in the floor; laser reflecting targets positioned on walls, ceilings, or other structures; or any other types of update markers. Regardless of the type of update marker, the computer program displays the location of each update marker on the computer screen, allows each one to be uniquely identified, and stores their location and identification.

Steps 122–134 comprise all of the different steps that can be taken to input information into the computer program. As noted above, it is not necessary to utilize all of these steps, nor is it necessary to follow them in the order depicted in FIG. 3. As a convenience to the user, the computer program is adapted to allow the various information input in steps 122–134 to be input into separate layers, as the term "layers" is used in conventional CAD programs. For instance, the traffic control locations could all be entered in a single layer that could then be displayed by itself or visually turned on or off. This can be especially helpful in situations where there may be a significant amount of visual clutter on the computer screen and the user wishes to remove some of the clutter. Alternatively, by allowing only separate layers to be individually displayed, the program makes it easier to view and analyze the various components of the system design.

The program is further designed to automate many of the tasks associated with the inputting of information into the computer in steps 122–134. The program is adapted to automatically assign path identifiers to the various paths, which can be edited by the user if the user wants to change this automatic choice of identifiers. One algorithm the program may use to accomplish this automatic path identification task is to start at a given point on the guidepath and move along on the guidepath until a branch is encountered. At the branch, the program picks unique identifiers for each of the different branch paths. The program then proceeds to search along one of these branches until another one is encountered. At this branch, unique identifiers are again given to each branch. This process continues until all the guidepaths have been sufficiently identified to specify the different branches available for travel at each fork in the path.

Another automatic feature of the program is the automatic inputting of traffic control points. The program may be adapted to automatically locate and identify all path intersections, divergences, and convergences. This can be carried out using known programming techniques. One example of an algorithm that may be used to automatically identify all divergences can operate as follows. Program 20 picks an arbitrary straight segment 140. Program 20 then searches all of the rest of the segments for any ones that have a beginning point that is the same, or within a short distance (such as a fraction of an inch), of the ending point of the selected segment. If there are more than one such segments, then a divergence has been located and program 20 identifies the end of the selected segment as the start of the divergence. Program 20 then selects another segment and tests to see if its endpoint is attached to the beginning point, or within a fraction of an inch, of any other segments. If so, another divergence is identified. If not, program 20 selects another segment to test. This continues until program 20 has selected and tested all of the guidepath segments. After doing so, program 20 knows where all of the divergences are and can indicate this graphically in area 70 in any suitable manner. Similar algorithms can be used to identify intersections and convergences.

If the user of program 20 wants it to automatically place traffic control symbols at each intersection or merger, the user simply prompts the program to do so. The program accomplishes this automatic traffic control placement feature by simply placing zone-beginning symbols a predetermined distance upstream of each merger and intersection, and zone-ending symbols a predetermined distance downstream of each of these mergers and intersections. These distances are selected to ensure that sufficient time is allotted to allow the vehicle to stop if a zone is occupied, and to allow any trailers which a vehicle may be towing to exit the zone. The automatically placed traffic control symbols can, of course, be edited by the user. The various automated tasks may be accessed by way of menus or appropriate buttons in the toolbars.

After steps 122–134 have been completed, the program can carry out validation step 44. It will be understood that validation step 44 does not necessarily have to occur after the total completion of steps 122–134, but could instead be partially performed after each piece of information is input by a user. For example, after each line or arc segment is input by a user, certain validation tests may be immediately run to ensure that the information submitted by the user is valid. Such validation tests may include checks to see that a path segment is not too close to an obstacle or that an arced path does not have too small of a radius of curvature. If such tests reveal problems, the user is notified immediately so that corrections can be made without having to re-design substantial portions of the system. The validation tests can be initiated by clicking on a test button 172 in AGVS toolbar 64. More details about the types of tests and the manner for performing them are discussed below.

Validation step 44 performs two basic checks. First, it checks to see that the system information that has been input is complete and internally consistent. Second, it checks to see that the information entered is consistent with the particular types of AGVs that will be used. With respect to the first check, program 20 automatically determines for the user where each and every intersection, merger, and branch is located in the path layout. These determinations can be accomplished by various known programming techniques. After these locations are determined, program 20 checks to see that a traffic control point is associated with each intersection and merger, and that a decision point is associated with each branch. If any of these are missing, program 20 alerts the user to let him know that insufficient information has been entered into the program. Program 20 also tests each decision point to ensure that the paths that are available at that particular branch are properly specified. Program 20 further checks to ensure that zones are properly defined, such as, for example, checking to see that every zone-beginning symbol is matched with at least one zone-ending symbol. Other checks may be performed to ensure that the inputted information is complete and that it defines an operational system.

In addition to the foregoing tests, program 20 is adapted to allow a user to check to see that the system information entered by the user is compatible with one or more specific vehicles. In order to perform some of these tests, information about the particular vehicle needs to be entered. This information includes such items as the vehicle length, width, wheelbase, maximum and minimum stopping distances, minimum turning radius, update marker detection range, location of the guidepoint, the steering geometry of the vehicle (i.e. the geometries which determine the kinematics of the vehicle), whether the vehicle carries it load on its top (a unit load carrier) or tows one or more carts behind it (a tugger), and the length, width, wheelbase, steering geometry, and number of carts or trailers towed by the vehicle if it is a tugger. This information is preferably entered only a single time for each type of vehicle and then stored by program 20 in an accessible location. Some of this information may have to be determined experimentally, such as the maximum path width that is required for a given vehicle with a certain number of trailers as it goes around a curve. The user of program 20 can thereafter select which type of vehicle (and any associated trailers) is to be used with a particular system and program 20 will automatically retrieve the information associated with that vehicle (and its trailer(s)).

Program 20 uses the vehicle information to perform a number of different tests. One test is to ensure that the vehicle pathways are not placed too close to obstacles. Obstacles are non-AGV elements displayed on the visual display, such as, for example, walls. Program 20 distinguishes between obstacles and various markings, labels, and other reference elements that do not represent physical object but may be present for informational purposes on floor plan 98 or the path drawings displayed on the computer monitor. Program 20 allows the user to select individual items and indicate whether they represent physical objects (and thus obstacles), or not. Program 20 further allows the user to select entire layers—as the term "layers" is used in conventional CAD programs—of the drawing and identify them as containing obstacles or non-obstacles. Any information entered in step 122 is automatically assumed by program 20 to not be an obstacle. After the obstacles are identified, program 20 automatically checks to see that the guidepath never encroaches too closely to any obstacles in the floor plan that are positioned alongside of the guidepath. This test is performed based at least partially on the width of the vehicle. If, for example, a pathway is defined two feet away from a wall, and parallel to it, then it is not possible for a vehicle greater than four feet wide to follow this path without hitting the wall (assuming the vehicle follows the guidepath by maintaining its center over the guidepath). Of course, AGVs do not follow guidepaths with perfect fidelity and program 20 includes a user-definable amount of leeway that is used to determine whether vehicle paths are too close to objects in the floor plan.

Another test performed by program 20 is to see if any curved sections of the guidepath have a radius of curvature less than the minimum turning radius of the AGVs. If such sections are located, an error message is displayed indicating that the guidepath turns at a faster rate than the vehicle will be able to follow. The user can then make appropriate corrections to the guidepath.

Program 20 also uses the location of the vehicle's guidepoint in performing various tests. The guidepoint is the location on the vehicle which the AGV attempts to have track the guidepath. Typically this is centered laterally on the vehicle and positioned longitudinally at the vehicle's steering point, guide point, center point, center of gravity, or other computationally useful location. Program 20 uses the location of the guidepoint in determining, for example, whether a guidepath passes too closely to an obstacle. If the guidepoint is centered laterally on the vehicle, then the guidepath must not pass any closer than half the vehicle's width plus a chosen safety clearance to the obstacle.

The guidepoint is also used by program 20, along with the length of the vehicle and its steering geometry, to test whether the curved sections of the guidepath are valid. Depending on the longitudinal location of the guidepoint, the vehicle will trace different paths when following curved sections of the guidepath. By knowing the guidepoint, steering geometry, and the length of the vehicle, program 20 can calculate how much clearance a vehicle needs when traversing a curved section of guidepath. Based on this calculation, program 20 checks to see if any curved sections of the guidepath are closer to an obstacle than this calculated value. If they are, an error message is displayed.

If the particular AGV is a tugger AGV that tows its load behind it, then the vehicle will typically need even more clearance when taking a turn or traversing a curve. Program 20 is designed to calculate the minimum clearance necessary for these vehicles based on the length, width, and steering geometry of each individual towed cart, as well as the number of these that may be towed. Such calculations can be carried out in a conventional manner, as would be known by one skilled in the art. Based on these calculations, all of the curved sections of guidepath are tested to see whether they pass too close to any obstacles, and appropriate error messages are displayed if there is insufficient clearance.

Program 20 uses the maximum stopping distance of a given vehicle to automatically check to see that the traffic control points 160 are placed at acceptable locations. For example, traffic control points must be placed more than the maximum stopping distance away from an intersection or merger. If they are not so placed, a vehicle that entered a zone and was to yield to another vehicle might not be able to stop in sufficient time to avoid hitting the other vehicle. Program 20 automatically computes the distance from traffic control points to the upcoming intersection or merger to see that they include sufficient distance to allow vehicles to stop in time.

Program 20 also checks to see that the guidepaths do not pass too closely to each other, just as it checks to see that they do not pass too closely to obstacles. If the guidepaths are too close, program 20 prompts the user to either make a correction to the guidepath layout, or add appropriate traffic control points. For example, if two parallel guidepaths are defined three feet apart, and the paths are to be followed by vehicles that are each four feet wide, it is not possible to have vehicles traveling side-by-side on each path without colliding. In order to avoid such collisions, the paths must be re-defined with more separation, or one or more traffic control zones must be defined to ensure that vehicles do not attempt to occupy space that another vehicle is currently occupying.

Program 20 is further designed to test to see that the update marker locations are sufficient. Program 20 includes a menu or other interface item that allows the user to enter various requirements for the location of the update markers. For example, if the update markers are floor-embedded update markers, the update markers often cannot be spaced apart greater than a certain distance. This maximum separation can be entered by a user, and program 20 will automatically compute the length of guidepath between each update marker to see if this maximum distance is exceeded. If so, an error message is displayed. Other requirements for floor-based update markers may also be entered, such as requirements that update markers be placed within a specified distance before and/or after turns. If the update markers are laser reflectors or other types of markers, maximum spacing limits may also be applicable. In addition to the foregoing distance tests, program 20 also uses the detection range of the particular vehicle to check to see that the update markers are placed sufficiently within detection range of the vehicle. Program 20 also uses this detection range information when determining whether the update markers have been spaced too far apart. In other words, if two update markers are spaced less than the maximum amount of distance apart, but one of them is outside the range of detection of the vehicle so that the next detectable marker is greater than the maximum-allowed spacing from the first detectable marker, an error message is displayed.

Program 20 is further adapted to automatically insert update markers in sufficient numbers and at appropriate locations based on the foregoing rules. This automatic update marker insertion feature is an optional feature that a user can access and utilize as part of step 134. If utilized, the user if free to edit the number and placement of the update markers after they have automatically been placed. By way of this feature, the user of program 20 does not have to be familiar with the rules for proper placement of the update markers, but can instead rely on program 20 to ensure the update marker part are properly placed.

A useful tool provided by program 20 that helps in the validation of a particular design is the automatic highlighting of the route an AGV will follow when traveling from one given destination to another. Program 20 is adapted to highlight on the computer monitor what route a vehicle will follow whenever the user prompts the computer to do so. When so prompted, the user specifies which location the vehicle should start from, and which destination the vehicle should travel to. Program 20 uses the input guidepaths and decision point information at the various branches to visually highlight to the computer user what path the vehicle would actually follow in this situation. The visual highlighting can be accomplished by changing the color of the path sections that define the route, or by other means. This path highlighting feature provides a user-friendly tool for a person to analyze a given system design.

After all of the validation tests of step 44 are completed, program 20 allows a user to optionally simulate at step 46 the movement of AGVs in the system that was defined in step 122. Simulation step 46 visually displays the movement of AGVs on the guidepath 136 following the paths and acting in accordance with the action points or locations that were entered by the user in step 122. The terms "action points" or "action locations," as used herein, are synonymous terms used to generically refer to the decision points, command points, traffic control points, update markers, and destinations referred to above. At each of these locations, the AGV will take some sort of action specified by the particular point or location. In some cases the action may not be visible to a viewer, such as when the vehicle passes traffic control point 160*a* and the action it takes is to merely to check the occupancy status of the zone it is about to enter. Likewise, when a vehicle reaches a destination other than its commanded destination, the only action a vehicle will take at the destination is the determination that it has reached a destination other than its assigned destination (assuming program 20 is used with a de-centralized control system, as explained more below). On the other hand, actions that are clearly discernable include such things as changing direction, changing speeds, stopping, or turning a particular way at a guidepath divergence.

In carrying out the simulation, the number of vehicles in the system is chosen and their initial location is specified by the user. The vehicles can be given commands to travel to certain destinations by the user, or random or pre-determined destinations can automatically and repeatedly be assigned to vehicles to keep the vehicles moving. For instance, if a vehicle is initially placed at destination 1 and is assigned to travel to destination 2, program 20 initially displays a symbol representing the vehicle at destination 1. The vehicle is displayed moving along path A in a clockwise direction until it comes to decision point 156. At decision point 156, program 20 checks to see what the assigned destination is for that vehicle. Based on the information entered by the user in step 122, decision point 156 will indicate that vehicles traveling to destination 2 are to switch to following path B. Program 20 will therefore display the vehicle image as turning right just past decision point 156 along path B. When the vehicle reaches destination 2, it will stop and the user will be prompted to enter another destination, or program 20 will automatically assign another destination to the vehicle. Once the vehicle is assigned a new destination, it will begin moving again along path B until it reaches traffic control point 160*b*. At that point, the vehicle will know it is entering a zone and will check to see if any other vehicles are currently occupying this zone. (The manner in which this check is performed will vary from AGV system to AGV system and is not part of the present invention. As one example, the vehicle may listen for a radio signal from other vehicles indicating that they are currently in that zone.) If so, it will stop. If not, it will continue to move along path B until it merges into path A. When the vehicle reaches traffic control point 160*c*, it will relinquish its claim to that zone, thereby freeing it up to be occupied by other vehicles. The vehicle will continue to move around the guidepath in a similar manner for as long as the simulation is run.

If the simulation is run with multiple vehicles, program 20 automatically stops a vehicle anytime it approaches closer than a user-definable distance to a vehicle ahead of it. This user-definable distance normally corresponds to the distance in which the actual vehicles are able to detect the presence of other vehicles in front of them. Such vehicle detection may be carried out by optical sensors, or other means. Simulation step 46 thus visually displays the stopping of vehicles that would occur in the actual system installation due to the vehicles approaching each other. Simulation step 46 therefore visually allows a person to see the movement of one or more vehicles throughout the facility as they would do so in an actual installation. Bottlenecks and other problems associated with a desired design can therefore be viewed prior to actually installing the AGV system, allowing such problems to be corrected before the actual installation.

The simulation of step 46 may also take into account the payload capacities of the AGVs, the time they can travel between battery re-charges, the top speed, and other variables that will affect the through-put of the material handling operation. From these parameters, program 20 can calculate the amount of material that is moved, how fast it is moved, the average distance loads travel, the amount of usage of individual vehicles, etc. These calculations allow the user to determine whether or not the system will meet its through-put requirements as it is currently designed. If any changes are made to any of the information entered by the user in step 122, the simulation of step 46 can be re-run to see how these changes affect the system. Program 20 therefore provides a good prediction of how any given system will actually function when it is installed.

Figure 12:
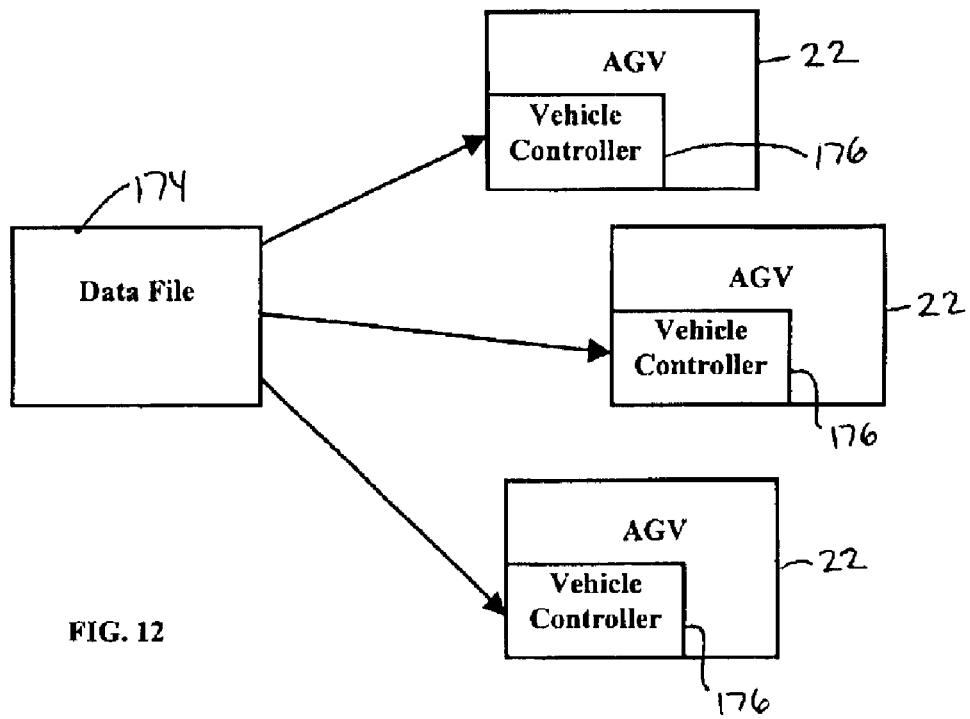
FIG. 12 is a block diagram of the manner in which a data file may be used in a decentralized control system.

At a final step 48, program 20 converts all of the input information into a computer file format that is usable by a vehicle controller 176 in the AGV system. The vehicle controller 176 may simply comprise a computer, a microprocessor and associated electronic circuitry, or any other electronic structures that are adapted to read the computer file and carry out the control of the vehicle based on the information stored within the file. The conversion process stores all of the data that was input into the computer in steps 122–134 in a computer file that is used by the vehicle controller to control one or more vehicles. The vehicle controller 176 may be part of a centralized computer used to control a plurality of vehicles (FIG. 13), or it may be part of the control system of a single vehicle (FIG. 12). In the case of the latter, each vehicle would have its own individual vehicle controller. The particular format of the computer file will depend upon how the vehicle controller uses the information stored by program 20. Typically, the layout of the guidepath will merely be stored in a manner that conventional CAD programs store drawings. The action points may be stored as conventional CAD objects, or otherwise. The information associated with each action point may be stored simply as a series of data files arranged in a format readable by the AGV system computer or computers (which may be part of a central controller, on board each AGV, or a combination of both). For example, the decision point information could merely be stored as data in a chart would be stored, with the first column indicating assigned destination numbers and the second column indicating the path branch to be selected for each assigned destination number.

An example of the contents of a computer file 174 that may be created in step 48 of method 20 is depicted in FIG. 11. The information of computer file 174 may be stored as a text file, or in any other suitable format. As illustrated, each of the entities that are created during the design of the material handling system are stored in the computer file, as well as additional data about each of these entities. For each straight path segment 140, nine data fields are stored in data file 174. These data fields include an identification of the segment, an identification of what path or paths are associated with that segment, the number of links to the starting point of the segment, the number of links to the ending point in the segment, the number of action locations associated with that segment, the starting point and ending point coordinates of the segment, an identification of the link segments, and an identification of the associated action locations.

All of this data may more easily be understood with reference to the AGV system depicted in FIG. 10. For purposes of explanation, the data that is stored for straight path segment 140*b* will be described. First, as mentioned, an identification of straight path segment 140*b* is stored. This can be any unique identifier such as a numeric or alphabetical designation, or a combination thereof. For purposes of description herein, the reference "140*b*" will be used as the identifier. An identification of the paths that segment 140*b* is part of is also stored. As was described previously, segment 140*b* is part of both paths A and B. The identification of these two paths would therefore be stored. The number of links to the starting point of segment 140*b* is also stored. The starting point of path segment 140*b* is its upstream end. In this case, only one other path segment, arc 138*a*, is linked to the upstream end of segment 140*b*. Therefore, the number 1 would be stored for this data field. The number of links to segments at the endpoint of straight path segment 140*b* is also stored. In this case, there are two links to the end point of segment 140*b*. These are segments 140*c* and 138*b*. Number 2 would therefore be stored for this data field. The starting point and ending point coordinates of segment 140*b* are also stored. These are stored as X, Y references based on a selected origin for a Cartesian coordinate system. The identification of each of the linked segments is also stored for straight path segment 140. This includes any numeric or alphabetical method of identifying the three segments that are linked, and may, for example, consist of the identifiers "138*a*," "140*c*," and "138*b*." Still further, an identification of each of the action locations associated with straight path segment 140*b* is also stored. As can be seen in FIG. 10, straight segment 140*b* includes two update markers 166 and a decision point 156. Program 20 assigns each of these entities an arbitrary identification, such as a numeric or alphabetical designation. These designations are stored with the information of path segment 140*b*.

The information listed in FIG. 11 that is stored in association with the straight path segments, and has been described above, is stored for each and every straight path segment in the AGV system. For each and every arc path segment 138 defined in the system, similar information is stored. All of the information that is stored for the straight path segments 140 is also stored for the arc path segments 138. In addition, each arc path segment includes an additional three data fields that identify the coordinates of the center point of the arc, the arc's starting angle, and the arc's ending angle. These extra data fields are necessary to fully define the position of, and the shape of, each arc segment 138.

Program 20 would thus store the following information for segment 138*b*. First, it would store an identifier for this segment, such as the code "138*b*." It would also store the path that is associated with 138*b*, which in this case is path B. The number of links at the starting point of arc 138*b* would also be stored. In this case segments 140*b* and 140*c* are both linked to segment 138*b*. The number 2 would therefore be stored for this data field. The number of links to the end point of segment 138*b* would also be stored. In this case, there is only one segment, 140*g*, that is linked to the end of segment 138*b*. The number 1 would therefore be stored for this data field. The number of action locations on arc 138*b* would also be stored. In the example of FIG. 10, there are no action locations, so the number 0 would be stored. As mentioned above, the starting point, ending point, center point, starting angle, and ending angle of arc 138*b* would also be stored. The identification of the link segments would also be stored, which in this case might be segment IDs "140*b*," "140*c*," and "140*g*." Identifiers for each of the action location on arc 138*b* would also be stored. Because there are no such action locations on arc 138*b*, no such identifiers would be stored for this arc path segment. For each straight path segment and each arc path segment, the information discussed above and identified in FIG. 11 is stored in computer file 174. In addition to this information, information about each of the action locations is also stored. These action locations include update markers, decision points, traffic control points, initialization points, and command points. The data fields that are stored for each of these locations are identified in FIG. 11. These will briefly be described herein.

For each update marker 166, an identification is stored for the update marker. The identification is any unique numeric, alphabetical, or other method of identifying a particular update marker. Typically, as with any of the data field identifications, these may be automatically assigned by program 20 in a sequential manner starting with the first update marker that is defined by the user. This first one may be assigned the number 1, and all the subsequent ones assigned subsequent numbers. Other identification schemes are also possible. For each update marker 166, the Cartesian coordinates of the marker are also stored. Thus, for every update marker 166 that is defined in a material handling system, file 174 includes a unique identifier for that marker and the coordinates for the location of that marker.

For each decision point 156 that is defined in an AGV system, there are three data fields that are stored in file 174. These include a unique identifier for the decision point. Again, these may be numeric, alphabetical, or some other type of identifications. The coordinates of the location of each decision point are also stored in file 174. Still further, a numeric code is stored for each decision point 156 that specifies what decisional logic will take place at that decision point. For example, the decision point 156 in FIG. 10 may be defined so that the vehicle will follow path B if it has been commanded to go to destinations 1 or 2, and will follow path A if it has been commanded to go to destination 3. This information may be stored as a code in a variety of different manners. In one example, the code may be stored as a path identifier followed by a number. If the vehicle's assigned destination is greater than the number after the path code, then the vehicle will change the path it is following to the path specified in front of that number. A series of as many of these codes as necessary to store all of the decision logic may be stored for each decision point in order to carry out the defined logic. For example, the codes "B00"and "A02" may be sequentially stored for decision point 156 in FIG. 10. The code "B00"tells the vehicle that it should switch to path B if its assigned destination is greater than 0. Because all of the destinations have a numeric identifier (1–3) that is greater than 0, this will cause the vehicle to switch, at least temporarily, to following path B. The subsequent code "A02" will instruct the vehicle to switch to following path A if its assigned destination is greater than 2. Thus, the vehicle will only switch to following path A if its assigned destination is destination 3 in the example of FIG. 10. This control logic will properly direct the vehicle no matter what path (A or B) the vehicle was following when it arrived at decision point 156. For more complex systems than that illustrated in FIG. 10, additional codes may be necessary to describe all of the intended instructions for a given decision point. As mentioned, other types of codes may also be used to store this information.

Three data fields are also stored for each traffic control point 160 that has been defined in a given material handling system. These data fields include a unique identifier for each traffic control point 166, the coordinates of each of these points, and a numeric code that specifies what type of traffic control the point is. With respect to the identifier, this can be any unique identifier that distinguishes the traffic control point from other traffic control points and other action locations. The coordinates are the X, Y location of the point. The numeric code identifies the type of traffic control point that has been defined, and thus allows different types of traffic control points to be defined. As one example, different types of traffic control points 160 that may be defined include traffic points that define the beginning of a zone and traffic points that define the ending of a zone. Other types of traffic control points may also be defined and stored as part of file 174.

For each initialization point that has been defined as part of the material handling system, three data fields are stored in file 174. These data fields include an identifier for the initialization point, the coordinates of the initialization point, and an identification of what path the initialization points are associated with. The identifier may be any unique identifier. The coordinates refer to the X, Y coordinates of whatever physical markers are being used to define the initialization points. As one example, the initialization point may include three magnets imbedded in the floor of the facility at predefined distances from each other and predefined orientations with respect to each other. The coordinates of each of these magnets would then be defined as part of this data field. As noted, the path associated with the initialization point is also stored. In the example of FIG. 10, the path identifier would either be A or B.

Three data fields are also stored for each of the command points 164 that have been defined as part of the material handling system. These data fields include an identifier for the command point, the coordinates of the command point, and a numeric code specifying the type of command. The identifier may be any unique identifier. The coordinates are the Cartesian coordinates of the location of each command point. A variety of different numeric codes may be specified and stored for each different type of command that may be carried out by the AGV. For example, if the AGV is to blow its horn, this may be assigned a specific numeric identifier. If it is to turn on its right indicator, this may be assigned another numeric identifier. For each and every command that the vehicle may carry out, a unique code may be defined. This unique code is stored as one of the data fields for each command point. When the vehicle controller 176 reads file 174, it can therefore determine what command should be carried out for a given command point.

As mentioned above, all of the information of file 174 may be stored as a text file. The information is preferably stored in a predefined format so that the vehicle controller 176 can read the information from any file 174 that has been created using method 20. As but one example, the information in the data fields for each of the guidepath segments may first be stored. Subsequently, the information for each of the action locations may be stored. Other arrangements are also possible.

After the data has been converted in step 48 to a computer file 174, the data is then usable by the AGV system. If the AGV system is a de-centralized AGV system, such as that illustrated in FIG. 12, the data will likely have to be loaded onto a vehicle controller 176 on each individual AGV. This can be accomplished by saving the data to a disk or non-volatile memory chip and carrying it to each AGV for uploading. Or this could be accomplished by transmitting the stored files by radio, or other electromagnetic means, to the AGVs. If the AGV system is a centralized system, such as that illustrated in FIG. 13, the file may only need to be stored at a location accessible by a single, centralized vehicle controller. The central vehicle controller 176 may then communicate with each AGV 22 wirelessly through a radio antenna 180, or through other means. Centralized vehicle controller 176 would read data file 174 and send appropriate commands to the vehicles 22 based on the contents of file 174, the locations of the vehicles, and the assigned destinations for the vehicles. The present invention finds equal application to both centralized and de-centralized AGV systems.

Figure 13:
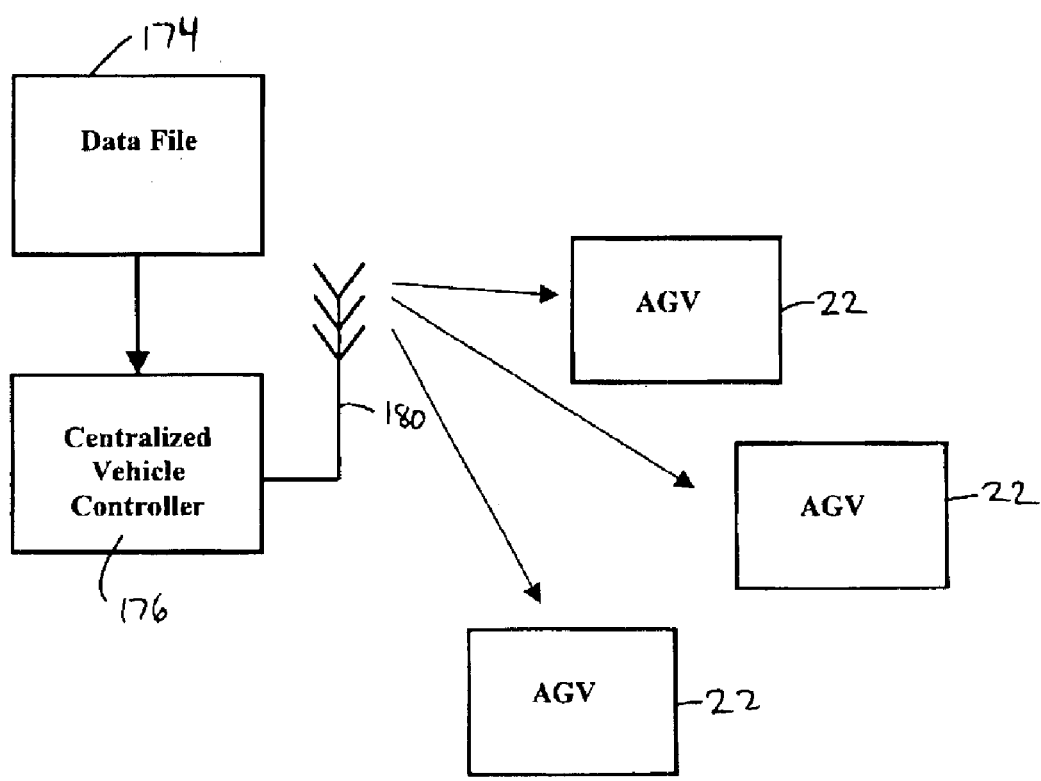
FIG. 13 is a block diagram of the manner in which the data file may be used in a centralized control system.

While the particular manner in which the vehicle controller operates is not part of the present invention, an illustrative example of both a centralized and de-centralized control system will be described herein to further explain the invention. In a centralized control system, the central vehicle controller 176 could use the file 176 as follows (FIG. 13). The central vehicle controller would monitor the location of each vehicle in the system and compare these positions to the positions of the guidepaths and action locations in the stored file. Whenever a vehicle reached or neared an action location, the central controller would read the information in the data fields that was stored in file 174 for that action location and send an appropriate signal to that particular vehicle. The particular signal would depend upon the particular action location. For a command action point, the controller would simply send the specified command to the vehicle. For a decision location, the central controller could simply transmit the control logic for that decision location, or more likely, decide which branch the vehicle should follow and only transmit that path identifier and/or the path's location. For traffic control location, the central controller would determine whether the zone about to be entered was occupied and, if so, send out signals to stop the vehicle before it entered the occupied zone. Traffic control locations positioned at the end of a zone would be used by the central controller to log the fact that a particular vehicle had exited a given zone, thereby freeing the zone up for occupancy by other vehicles.

In a de-centralized control system, the data file 174 would likely be stored in each individual vehicle (FIG. 12). As each vehicle continuously determined its position in the facility, the vehicle controller would repeatedly compare its position with the stored data. Whenever the vehicle reached an action point, it would read the information associated with that action point and take any appropriate action in response thereto. For example, if a vehicle entered a new traffic control zone, the vehicle might be programmed to check to see if that zone is occupied by another vehicle and, if not, to then broadcast a radio signal indicating that it is claiming that zone. The vehicle could be programmed to shut this broadcast off when it reached a zone-ending point. The zone ending points would be part of the data file created in step 48.

Program 20 allows a single user to easily design, test, and implement an AGV system. The data that defines a particular AGV installation is input into program 20 in a user-friendly and simple manner. After it is entered, it is validated automatically and converted to a format usable by the actual vehicles and/or control hardware and software that will be installed. Program 20 thus facilitates and simplifies the creation, testing, and implementation of the project-specific aspects of an AGV system. By automatically performing various tests, the designed system can be created without mistakes. By having all of the vehicle and system information stored in program 20, it is not necessary for the program user to be highly trained. Further, because the system design is entered and stored using a single program, the chances of miscommunication are greatly reduced. And still further, by providing a simulation feature, program 20 allows a system design to be tested prior to installation.

The programming for accomplishing the various algorithms and features of program 20 described herein can be carried out in any conventional manner, as would be known by one skilled in the art. Program 20 finds equal application to both wire-guided and wireless AGV systems. In wire-guided systems, program 20 is applicable where the position of the individual vehicle is repeatedly determined for comparison with the converted and stored information of step 48. In such wire-guided systems, of, course, it may not be necessary to enter any update marker information into program 20 as many wire-guided AGVs do not use update markers.

In addition to automatic guided vehicle systems, the present invention finds application to other types of material handling systems, such as, but not limited to, mono-rail systems, conveyor systems, sortation systems, and the like. In each of these systems, material moves on vehicles along paths throughout an environment. The present invention can be used to plan and store these paths and any associated control logic or related information. For example, each section of the conveyor having an article positioned on it could be treated by a central controller in a manner comparable to the AGVs described herein. The decision points described herein could be placed upstream of conveyor branches to allow the proper sortation of articles. The zone concepts could be used to slow down or stop the appropriate upstream conveyors when a downstream conveyor, or other structure in the material handling system, became filled with articles.

While the present invention has been described in terms of the preferred embodiments discussed in the above specification, it will be understood by one skilled in the art that the present invention is not limited to these particular preferred embodiments, but includes any and all such modifications that are within the spirit and scope of the invention as defined more particularly within the numbered paragraphs of the summary of the invention section herein.

What is claimed is:

1. A method of configuring a material handling system comprising:

providing a computer having a visual display; inputting information into said computer to cause said computer to visually display at least one path for a material handling unit and at least one symbol representing at least one action location at a position specified by a user;

inputting further information into said computer that at least partially specifies what action will take place when the material handling unit arrives at the at least one action location;

creating with said computer a computer file containing a location of said path, a location of said at least one action location, and the information that at least partially specifies what action will take place when the material handling unit arrives at the at least one action location; and transferring the computer file to a unit controller adapted to read said file and utilize the file to control the movement of the unit along said path and to control the action undertaken when the unit reaches the action location.

2. The method of claim 1 wherein said material handling unit is an automatic guided vehicle and said unit controller is a vehicle controller.

3. The method of claim 2 wherein said at least one action location includes at least one destination at which the vehicle will stop.

4. The method of claim 2 wherein said information that causes said computer to visually display at least one path is inputted using at least one device in communication with said computer and selected from the group consisting of a computer mouse, a trackball, a touch-screen, and a graphics tablet.

5. The method of claim 2 further comprising:
inputting information into said computer to cause said computer to visually display at least one symbol representing at least one update marker; and
including a location of said at least one update marker in said computer file.

6. The method of claim 2 further comprising inputting a map of an environment into said computer and visually displaying said map simultaneously with the visual display of said path.

7. The method of claim 6 wherein said map includes a floor plan of a building.

8. The method of claim 7 wherein said map further includes at least one obstacle.

9. The method of claim 2 wherein said information that at least partially specifies what action an automatic guided vehicle will take when it arrives at the at least one action location includes information specifying which path branch an automatic guided vehicle will follow where there is a fork in the path.

10. The method of claim 9 wherein said information specifying which path branch an automatic guided vehicle will follow at a fork in the path includes an identification of at least one possible destination and a corresponding path branch to follow at the fork in the path for the at least one possible destination.

11. The method of claim 2 wherein said information that at least partially specifies what action an automatic guided vehicle will take when it arrives at the at least one action location includes information used to prevent an automatic guided vehicle from colliding with other vehicles.

12. The method of claim 11 wherein said information that is used to prevent an automatic guided vehicle from colliding with other vehicles includes information identifying the beginning or ending of a particular zone.

13. The method of claim 12 wherein said zone defines an area which only one vehicle may occupy at a time.

14. The method of claim 2 further including inputting information about at least one physical aspect of an automatic guided vehicle into said computer, said computer being programmed to determine whether said path can be followed by a vehicle based upon said at least one physical aspect.

15. The method of claim 14 wherein said at least one physical aspect of said automatic guided vehicle is selected from the group consisting of the turning radius of the vehicle, the width of the vehicle, the length of the vehicle, the wheelbase of the vehicle, the steering geometry of the vehicle, the maximum stopping distance of the vehicle, and the minimum stopping distance of the vehicle.

16. The method of claim 2 further comprising visually displaying a simulation of the movement of at least one automatic guided vehicle on said visual display.

17. The method of claim 16 wherein said simulation of the movement of the at least one automatic guided vehicle includes simulating the movement of the vehicle as it would be affected by said at least one action location.

18. The method of claim 2 wherein said computer is programmed to automatically identify any path divergences and highlight said path divergences on said visual display.

19. The method of claim 18 wherein said computer is further programmed to automatically verify that sufficient information has been input to allow an automatic guided vehicle to select which path to follow at each path divergence.

20. The method of claim 3 further including selecting a destination and a starting point and prompting said computer to highlight on said visual display which path a vehicle would follow to travel from the starting point to the destination.

21. The method of claim 2 wherein said vehicle controller is positioned on said automatic guided vehicle.

22. The method of claim 2 wherein said vehicle controller is a centralized controller positioned off of said automatic guided vehicle and adapted to control a plurality of vehicles.

23. A method of configuring a material handling system comprising:
providing a computer having a visual display;
inputting information into said computer to cause said computer to visually display at least one path for a material handling vehicle and at least one symbol representing at least one action location at a position specified by a user;
inputting further information into said computer that at least partially specifies an action that will take place when the vehicle reaches the action location, said action being selected from the group consisting of:
(a) determining whether a particular zone of the path is being occupied, and
(b) determining which branch of the path the vehicle should follow at a path divergence;
creating with said computer a file containing a location of said path, a location of said at least one action location, and the information that at least partially specifies what action will take place when the vehicle reaches the at least one action location; and
transferring the computer file to a vehicle controller adapted to read said file and utilize said file to control the movement of the vehicle along the path and to control the action undertaken when the vehicle reaches the action location.

24. The method of claim 23 wherein said material handling vehicle is an automatic guided vehicle.

25. The method of claim 24 further including inputting information into the computer that defines a plurality of destinations and that causes the computer to visually display the plurality of destinations.

26. The method of claim 25 further including:
inputting information into said computer that defines a fork in the path having at least two path branches and that causes said computer to visually display the fork; and
inputting information into said computer that associates each destination with at least one of said path branches whereby the determination of which path branch the vehicle will follow at the fork is made based on the assigned destination of the vehicle.

27. The method of claim 25 wherein said vehicle controller is positioned onboard the automatic guided vehicle.

28. The method of claim 25 wherein said information that causes said computer to visually display at one path is inputted using at least one device in communication with said computer and selected from the group consisting of a computer mouse, a trackball, a touch-screen, and a graphics tablet.

29. The method of claim 25 further comprising:
inputting information into said computer to cause said computer to visually display at least one symbol representing at least one update marker; and including a location of said at least one update marker in said computer file.

30. The method of claim 25 further comprising inputting information into said computer that causes said computer to visually display a plurality of action locations, at least one of said plurality of action locations being positioned at the end of a zone and adapted to cause said vehicle controller to deem the zone unoccupied when the vehicle exits the zone.

31. The method of claim 30 wherein said vehicle controller is positioned onboard the automatic guided vehicle and the vehicle is adapted to transmit a wireless signal when it reaches the action location at the end of a zone.

32. The method of claim 26 further including inputting information about at least one physical aspect of an automatic guided vehicle into said computer, said computer being programmed to determine whether said path can be followed by a vehicle based upon said at least one physical aspect.

33. The method of claim 32 wherein said at least one physical aspect of said automatic guided vehicle is selected from the group consisting of the turning radius of the vehicle, the width of the vehicle, the length of the vehicle, the wheelbase of the vehicle, the steering geometry of the vehicle, the maximum stopping distance of the vehicle, and the minimum stopping distance of the vehicle.

34. The method of claim 26 wherein said computer is programmed to automatically identify any path intersections and highlight said path intersections on said visual display.

35. The method of claim 26 further including selecting a pair of destinations and prompting said computer to highlight on said visual display which path a vehicle would follow to travel from one of said pair of destinations to the other.

36. A material handling system comprising:

a computer;

a visual display in communication with said computer and adapted to visually display information transmitted from said computer to said display;

a user interface device adapted to allow a user of said computer to input information that is displayed on said visual display;

said computer being adapted to receive, and display on said visual display, information from a user through said user interface that defines at least one path and at least one action location along said path;

said computer being further adapted to receive and store information that at least partially specifies what action a material handling vehicle will take at the action location and to create a file containing a location of said path, a location of said at least one action location, and the information that at least partially specifies what action will take place when the vehicle reaches the at least one action location; and a vehicle controller adapted to read said file and utilize said file to control the movement of the vehicle along the path and to control the action undertaken when the vehicle reaches the action location.

37. The system of claim 36 wherein said material handling vehicle is an automatic guided vehicle and said computer is adapted to receive and store a plurality of action locations.

38. The system of claim 37 wherein said information that at least partially specifies what action a material handling vehicle will take at one of the plurality of action locations includes information allowing an automatic guided vehicle to select which path to follow at a fork in the path.

39. The system of claim 37 wherein said information that at least partially specifies what action a material handling vehicle will take at one of the plurality of action locations includes information allowing an automatic guided vehicle to avoid colliding with other vehicles.

40. The system of claim 39 wherein said information that at least partially specifies what action a material handling vehicle will take at one of the plurality of action locations includes information identifying the beginning or ending of a particular zone.

41. A method of configuring an automatic guided vehicle system comprising:

providing a computer having a visual display;

inputting information into said computer to cause said computer to visually display at least a first path for automatic guided vehicles, at least one symbol representing a first action location, and at least one symbol representing a second action location, said second action location being spaced from said first action location and defining a zone therebetween;

inputting further information into said computer that causes a vehicle controller to check to see if the zone is occupied when a vehicle reaches either said first or second action location;

creating with said computer a file containing a location of said path, a location of said first and second action locations, and the information that causes the vehicle controller to check to see if the zone is occupied when a vehicle reaches either said first or second action location; and transferring the computer file to the vehicle controller, said vehicle controller being adapted to read said file and utilize said file to control the movement of the vehicle along the path.

42. The method of claim 41 wherein said vehicle controller is positioned off-board the automatic guided vehicles.

43. The method of claim 42 wherein said vehicle controller is adapted to send a wireless signal to an automatic guided vehicle about to enter the zone, said signal allowing the vehicle that is about to enter the zone to enter said zone only if no other vehicles or obstacles are occupying the zone.

44. The method of claim 43 wherein said vehicle controller is adapted to communicate with a plurality of automatic guided vehicles and to store in memory the location of the plurality of automatic guided vehicles.

45. The method of claim 41 wherein there are a plurality of said vehicle controllers and each one of said vehicle controllers is positioned on-board an automatic guided vehicle.

46. The method of claim 45 further including:

inputting information into said computer to cause said computer to visually display a second path for automatic guided vehicles, said second path being located to define a fork with respect to said first path;

inputting information into said computer to cause said computer to display a third action location positioned upstream of said fork; and inputting information into said computer associated with said third action location that determines whether a vehicle will follow said first or second path when the vehicle arrives at said fork.

47. The method of claim 46 further including inputting information into said computer that defines additional action locations, said additional action locations identifying the location of update markers that are detectable by the automatic guided vehicles.

48. The method of claim 47 wherein said computer is programmed to automatically identify any path intersections and highlight said path intersections on said visual display.

* * * * *